(12) United States Patent  (10) Patent No.: US 7,520,456 B2
Swegle et al.  (45) Date of Patent: Apr. 21, 2009

(54) APPARATUS FOR MAKING, STORING AND DISPENSING SHAVED OR CRUSHED ICE

(75) Inventors: Thomas W. Swegle, Ankeny, IA (US); David Swegle, Nevada, IA (US); Tad D. Upah, Marshalltown, IA (US); Duane Bulanek, Marshalltown, IA (US); Kevin Kinch, Ankeny, IA (US); Craig Jensen, Adair, IA (US)

(73) Assignee: Paragon International, Inc., Nevada, IA (US)

( * ) Notice: Subject to any disclaimer, the term of this patent is extended or adjusted under 35 U.S.C. 154(b) by 31 days.

(21) Appl. No.: 11/352,672

(22) Filed: Feb. 13, 2006

(65) Prior Publication Data

US 2006/0186238 A1 Aug. 24, 2006

Related U.S. Application Data

(60) Provisional application No. 60/652,136, filed on Feb. 11, 2005.

(51) Int. Cl.
*B02C 18/16* (2006.01)
(52) U.S. Cl. .............. 241/100; 241/285.1; 241/DIG. 27
(58) Field of Classification Search .............. 241/100, 241/285.1, 285.2, 285.3, 169.1, 92, DIG. 27
See application file for complete search history.

(56) References Cited

U.S. PATENT DOCUMENTS

| D195,312 | S | 5/1963 | McCollum et al. |
| 4,906,486 | A * | 3/1990 | Young .................. 426/518 |
| D429,597 | S | 8/2000 | Lee |
| D462,568 | S | 9/2002 | Li |
| D463,951 | S | 10/2002 | Wade |
| D469,302 | S | 1/2003 | Li |
| D471,059 | S | 3/2003 | Chuang |
| D483,985 | S | 12/2003 | Huang |

* cited by examiner

*Primary Examiner*—Mark Rosenbaum
(74) *Attorney, Agent, or Firm*—McKee, Voorhees & Sease, P.L.C.

(57) ABSTRACT

An apparatus and method for creating shaved, chipped or crushed ice and/or storing such ice at least temporarily. The apparatus includes a housing with a base adapted for placement on a surface such as a table or counter top. A one piece housing is moldable out of plastic. It includes a floor, a front and back, sides, and a top or ceiling. An opening in the back allows access into a substantially enclosed inner chamber or ice cabinet. Optional aspects of the apparatus include a viewing window, a molded drain pan floor in combination with a drain outlet, peak for elevation of the floor from the surface, a manually operated handle and ice ram for forcing ice blocks or cubes against a motorized ice shaver, and a shape and configuration to simulate an igloo or dome shape.

10 Claims, 23 Drawing Sheets

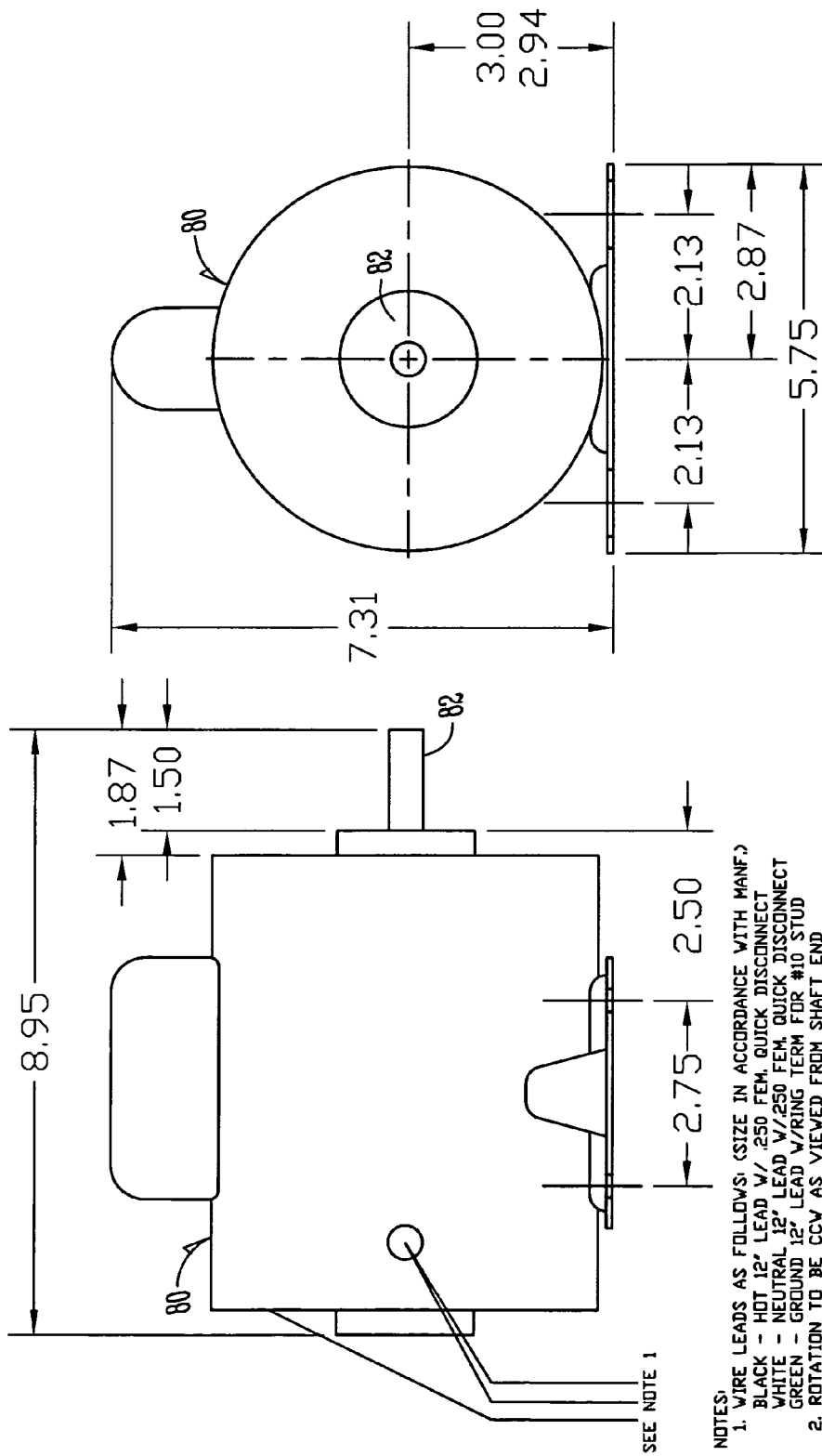

“APPARATUS FOR MAKING, STORING AND DISPENSING SHAVED OR CRUSHED ICE

CROSS-REFERENCE TO RELATED APPLICATIONS

This application claims priority under 35 U.S.C. § 119 of provisional application U.S. Ser. No. 60/652,136 filed Feb. 11, 2005, and U.S. Ser. No. 29/223,310 filed Feb. 11, 2005, which applications are hereby incorporated by reference in their entirety.

I. BACKGROUND OF THE INVENTION

A. Field of the Invention

The present invention relates to an apparatus for making shaved, crushed, or otherwise smaller particle size ice from a larger size starting ice, and in particular, to an integrated device that allows conversion of block or cubed ice into shaved or smaller particle ice, temporary storage of the produced ice, and selective dispension of the produced ice.

B. Problems in the Art

A variety of shaved, chipped, or crushed ice desserts or treats are known. One primary example is what is commonly referred to as the "snow cone". Block or cubed ice is shaved or crushed into relatively small ice pieces, shavings, or particles, a scoop of the particles are placed in a paper cup or cone, and sweetened, flavored, and/or colored syrup is poured on the scoop to complete the food item.

Conversion of block or cubed ice into such small particles by hand, even for the quantities or volumes involved with snow cones, involves substantial manual labor and is generally seen as impractical. Therefore, a variety of machines have been developed to accomplish this task. Relatively small, counter-top consumer machines exist. However, they must be manually cranked or operated, or use relatively low power electrical motors. They tend to be slow and typically do not have any on-board storage for the shaved or crushed ice, so the ice must be prepared for each snow cone, one at a time. They may be satisfactory for home use, but not for higher volume needs or uses.

Therefore, in more commercial contexts, or when greater volume is desired or required, relatively large floor models have been developed. They include a relatively large electric motor with substantial horsepower and throughput, plus a large ice cabinet in which a relatively large volume of shaved or crushed ice can be stored ready for use. These may work well for their intended purpose, but are cumbersome to move, relatively expensive, and take up substantial floor space. They also might not be practical for certain situations. Some are housed in hand carts, with bicycle-size wheels to assist in movement over the ground or floor. They tend to have a relatively tall, rectangular cabinet into which ice can be stored.

Therefore, attempts have been made to create a machine somewhat in-between the small, countertop home-use models and the large floor models. They utilize a relatively robust electric motor that spins shaving or crushing blades and have a ice cabinet. Some of these present "in-between" models are tabletop size (bigger than counter-top home use size but smaller than floor model size) and are generally capable of being lifted and carried, at least for relatively short distances. They tend, however, to follow the floor model versions in that they comprise a rectangular box shaped frame with clamped in windows on at least three sides and a relatively flat top and bottom. A motor and ice feed tube are situated at or near the top of the cabinet. The whole machine can be set on top of a table or support. Periodically the operator feeds ice into the ice feed tube, pushes an ice ram against the ice in the feed tube to force it against rotating blades to shave, chip, or crush it, and collects the shaved ice into the cabinet for storage and for viewing by people in front of the machine. The operator has access to the ice cavity, and can reach in and scoop out a serving of the stored shaved ice when needed to create a snow cones.

However, it has been determined that there is room for improvement with these types of devices. For example, room for improvement exists with respect to practicality, flexibility, and cost. Additionally, the rectangular or box devices are still cumbersome to move and thus lack ease of portability. Furthermore, there are issues of robustness and durability, as well as operational issues with existing machines. Finally, there remains room for improvement regarding the attractiveness of such machines.

II. SUMMARY OF THE INVENTION

It is therefore a principle object, feature, advantage or aspect of the present invention to provide an apparatus for making, storing, and distributing shaved or crushed ice which improves upon or solves problems and deficiencies in the art. Examples of specific objects, features, advantages or aspects according to the invention are as follows:

1. One aspect of the invention utilizes a generally dome or paraboloid shaped housing having a bottom with a set of spaced apart, downwardly extending feet for supporting the apparatus on a tabletop or generally flat surface. A motor is housed in the top adjacent to a curved ice feed tube that has a generally upwardly oriented open outer end and curves down and into the top of an ice cabinet in the housing. The ice cavity or cabinet has a somewhat trapezoidal, somewhat oval shaped opening in the back for access to the ice cavity by the operator, with a similar shaped opening in the opposite or front side. A transparent or translucent insert or window covers the front opening. The ice cavity is therefore substantially enclosed except for the back opening. The shape presents a relatively durable, robust structural housing for the apparatus. It provides a base that is wider than the top for stability. It also provides an attractive presentation to users and customers.
2. Another aspect of the inventor utilizes a manually operated elongated handle which is pivotally attached to the ice feed tube. It has an extension or ram which has a shape which complements the interior of the ice feed tube. The handle can be pivoted down to bring the ram into abutment with any ice in the ice feed tube and push the ice against a rotating chopper head, which includes one or more shaving or crushing blades. Ice is forced by a continued downward pressure of the handle against the chopper head, rotation of the head and action of the rotating blades serve to convert the feed ice to smaller particles. Shaved or crushed ice particles drops by gravity through a space below the rotating chopper heat into the ice cavity.
3. In another aspect of the invention, a structural support can be placed along the ice feed tube and connect to the main housing to resist forces caused by forcing the handle down against the ice in the feed tube.
4. In another aspect, the added structural support is integrated into the housing by molding. It can additionally function as a location where the handle can be releasably locked into place relative the housing.

5. In another aspect of the invention, the housing includes feet to hold the bottom of the apparatus off of the table and allow the bottom to take the form of a sloped drain pan that includes a drain at its lowest point, where the drain is recessed from the side of the housing and recessed into the bottom of the housing. The recess is sufficient to allow a hose fitting to extend from the drain laterally without extending past the perimeter of the side of the housing. This protects the hose fitting and recesses it from view. Other machines have hose fittings that extend out of the side of the housing, which exposes the fitting to potential damage.
6. Another aspect of the invention is the utilization of relatively large feet of relatively high coefficient of friction. Additionally, relatively high resiliency in the feet allows for a more stable placement on a surface as well as resistance to vibration.
7. In another aspect of the invention, a set of wheels is integrated into the housing. In one embodiment, they are at one side of the lower housing but elevated above the plane of the distal surfaces of the feet, which allows the wheels to be slightly raised off of a surface when the apparatus is placed on its feet on a flat surface. The whole apparatus can simply be tipped backwards on the wheels to allow it to be rolled across a surface (e.g. a floor) for easy portability.
8. In another aspect of the invention, the elongated handle to manually operate the ice ram can extend substantially away from the housing. It can also be lockable relative to the apparatus in a position. It can also be ergonomically configured for easier grippability to use the handle both to push ice in the ice feed tube and as a handle to pull or lift the apparatus. In combination with the wheels, it assists in rolling the apparatus across the surface by locking the handle relative the housing, grabbing a portion of the handle, and pulling the apparatus on the wheels.
9. A still further aspect of the invention involves use of a transparent or translucent window in one side of the housing but mounting it utilizing an adhesive sealant. This eliminates utilization of hardware to merely attach a window. It also provides a seal around the inserted window.
10. In another aspect of the invention, the housing is made of molded plastic. Threaded inserts are molded into the plastic which allows quick and easy attachment or removal of parts or additional components to the housing.
11. In another aspect of the invention, the housing can include areas of varying thickness for structural purposes. Examples are a raised or thicker area around the opening into the ice cavity. Another example would be the top of the ice cavity to which the motor can be mounted. Still further areas are where the wheels or feet are mounted. Instead of using added pieces for structural purposes, the thicker portions can provide similar function but can be formed with the molding of the housing.
12. Another aspect of the invention comprises a removable multiple cup holder, which also dispenses cups one at a time. The bracket for the cup holder can be installed directly to the housing. The cup holder can be removed and placed inside the ice cavity when the apparatus is stored or moved.
13. Another aspect of the invention comprises a motor control circuit. A momentary switch allows the operator to power the motor to spin the blade. When the operator releases pressure on the momentary switch, the blade stops because power is cut off to the motor. Additionally, a sensor is added to the motor to sense if it reaches an over-current situation. This would be indicative of the blade being jammed and not being able to rotate even though the momentary switch is on. If sensed, power to the motor is disconnected automatically even if the momentary switch is turned on. A manual reset switch must be pushed to allow the momentary switch to control power back to the motor. This would allow a fail safe for the operator to clean out ice from around the blade. It would require the operator to take two steps; press the reset manually and then press the momentary switch to rotate the blade.

These and other objects, features, advantages and aspects of the present invention will become more apparent with reference to the accompanying specification.

III. BRIEF DESCRIPTION OF THE DRAWINGS

FIGS. 3A-F are the same views as FIGS. 2A-F, except they are isolated views of just the lower part of the housing of FIGS. 2A-F.

FIGS. 4A-F are the same views as FIGS. 2A-F, except they are isolated views of just the handle/ice ram of FIGS. 2A-F.

FIGS. 5A-F are the same views as FIGS. 2A-F, except they are isolated views of just the upper part (the top or cover) of the housing of FIGS. 2A-F.

FIGS. 6A-E are plan and sectional views of a chopper head that is used inside the housing of FIGS. 2A-F.

Figure 7A:
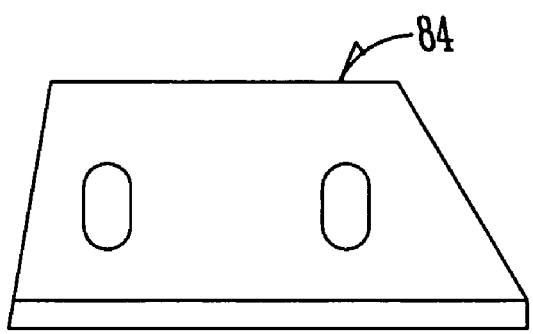
Figure 7B:
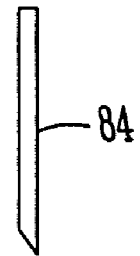

FIGS. 7A and B are two views of a blade of the type that can be installed in two positions on the chopper head of FIGS. 6A-E.

FIG. 8 is an illustration of the general type of motor that can be mounted inside the housing of FIGS. 2A-F and used to turn the chopper head of FIGS. 6A-E.

Figure 1:
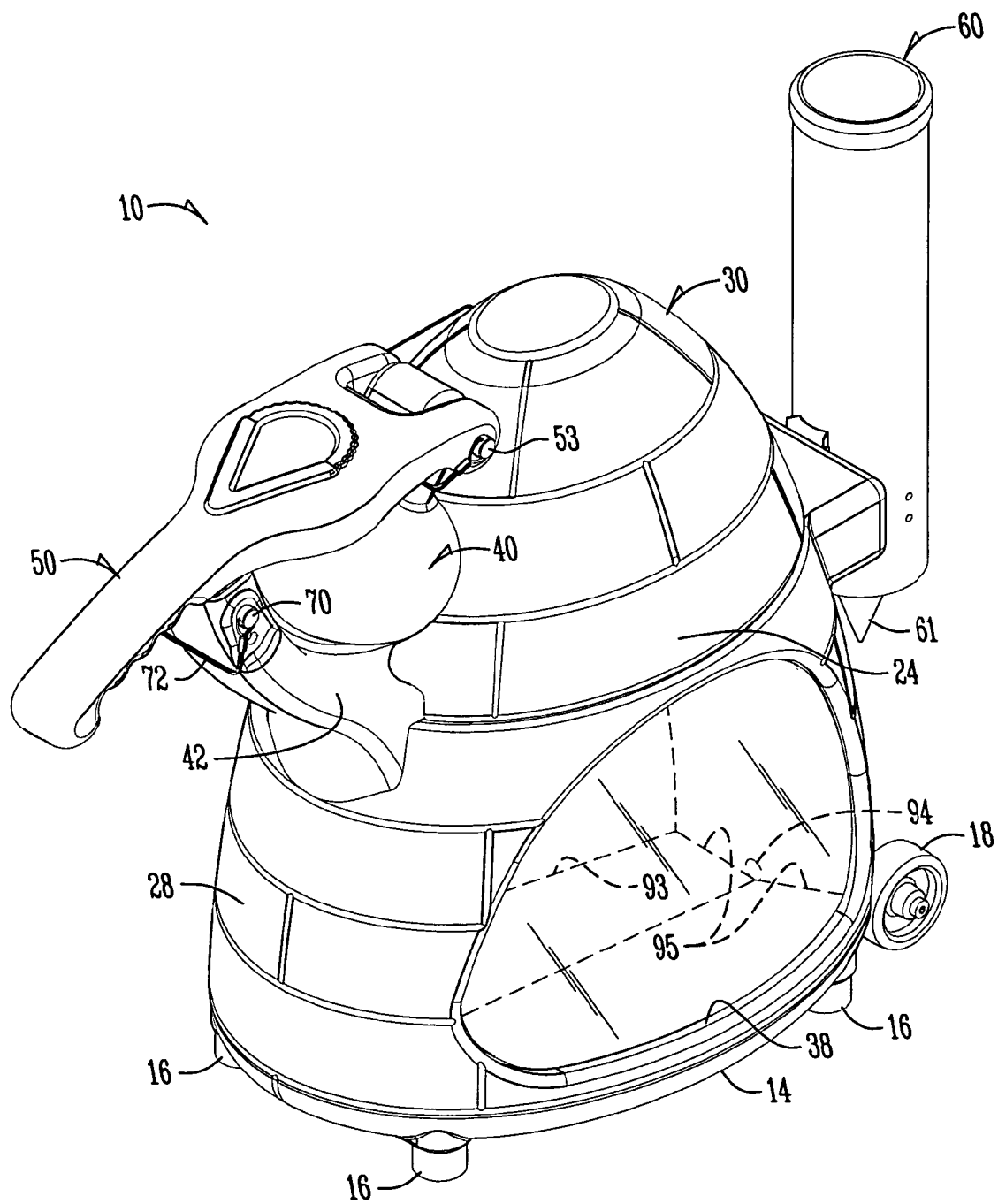
FIG. 1 is an assembled perspective view of an exemplary embodiment of an apparatus according to the invention.
Figure 9:
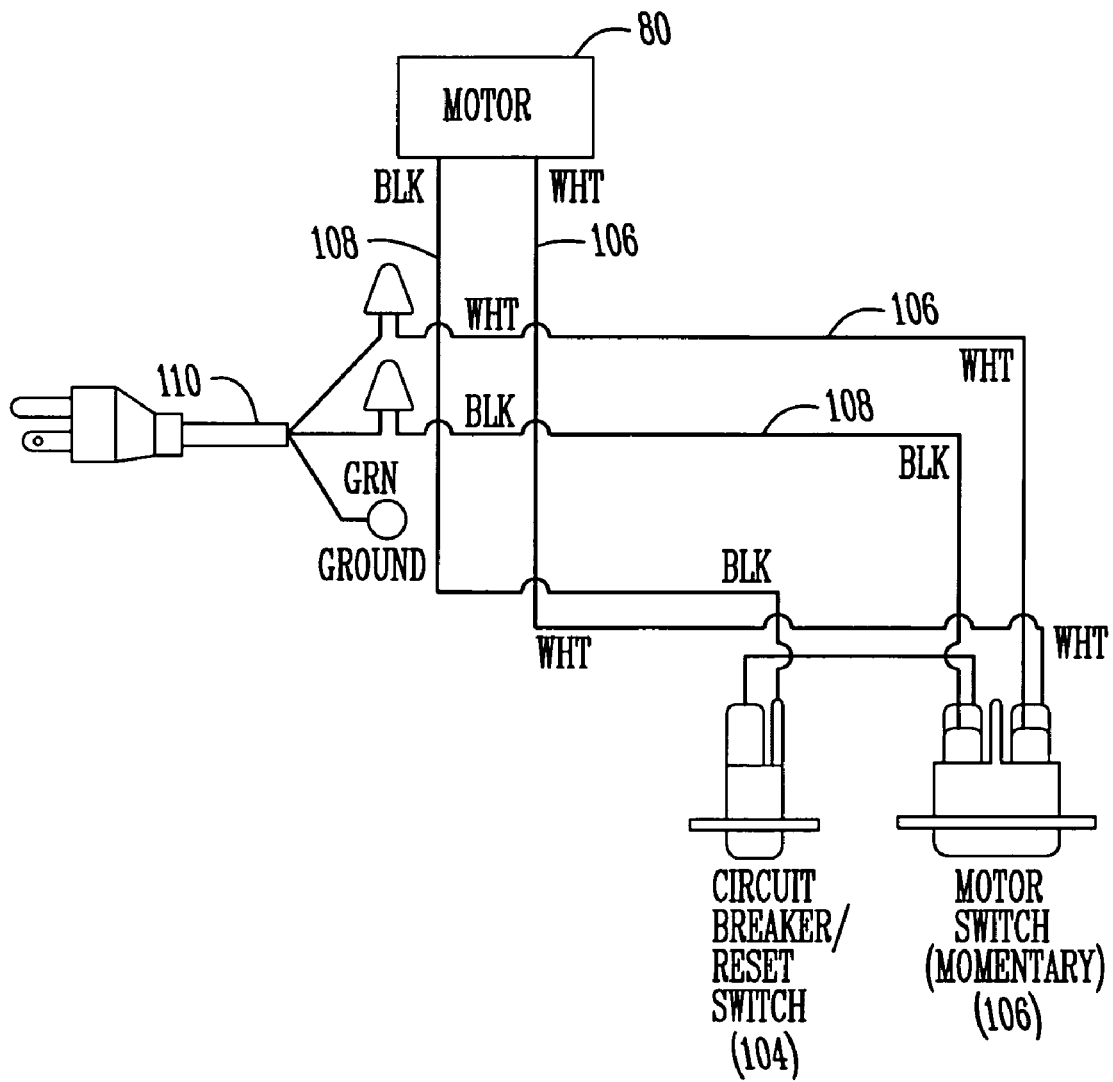

FIG. 9 is an electrical circuit diagram for the embodiment of FIG. 1.

Figure 10A:
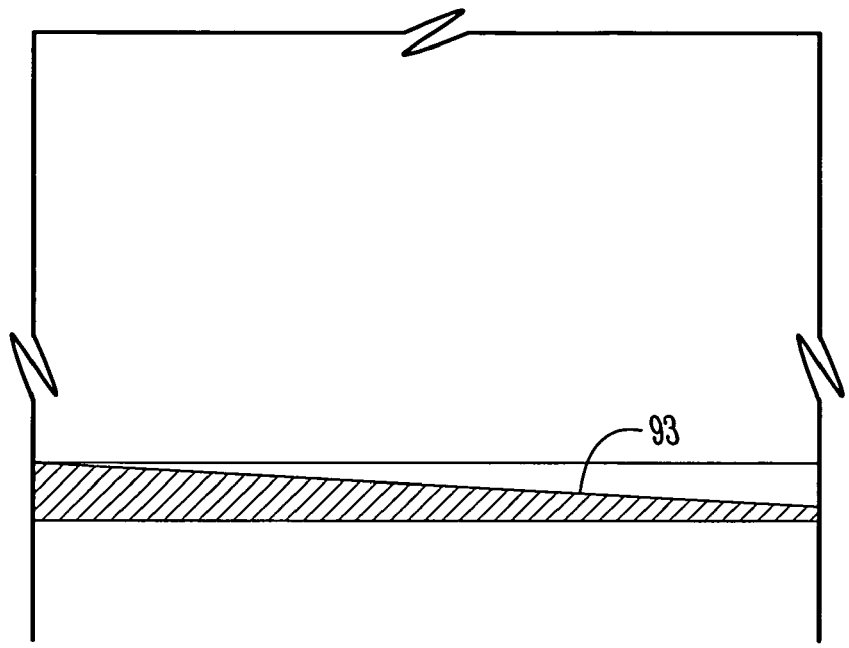
Figure 10B:
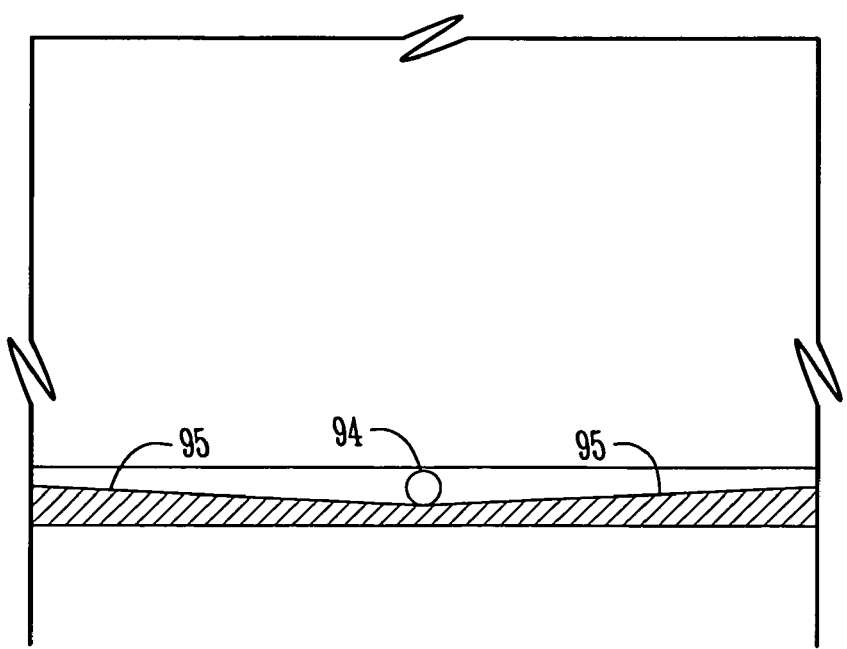

FIGS. 10A and B are diagrammatic sectional illustrations of the drain pan and drain of the floor of the device.

Figure 11:
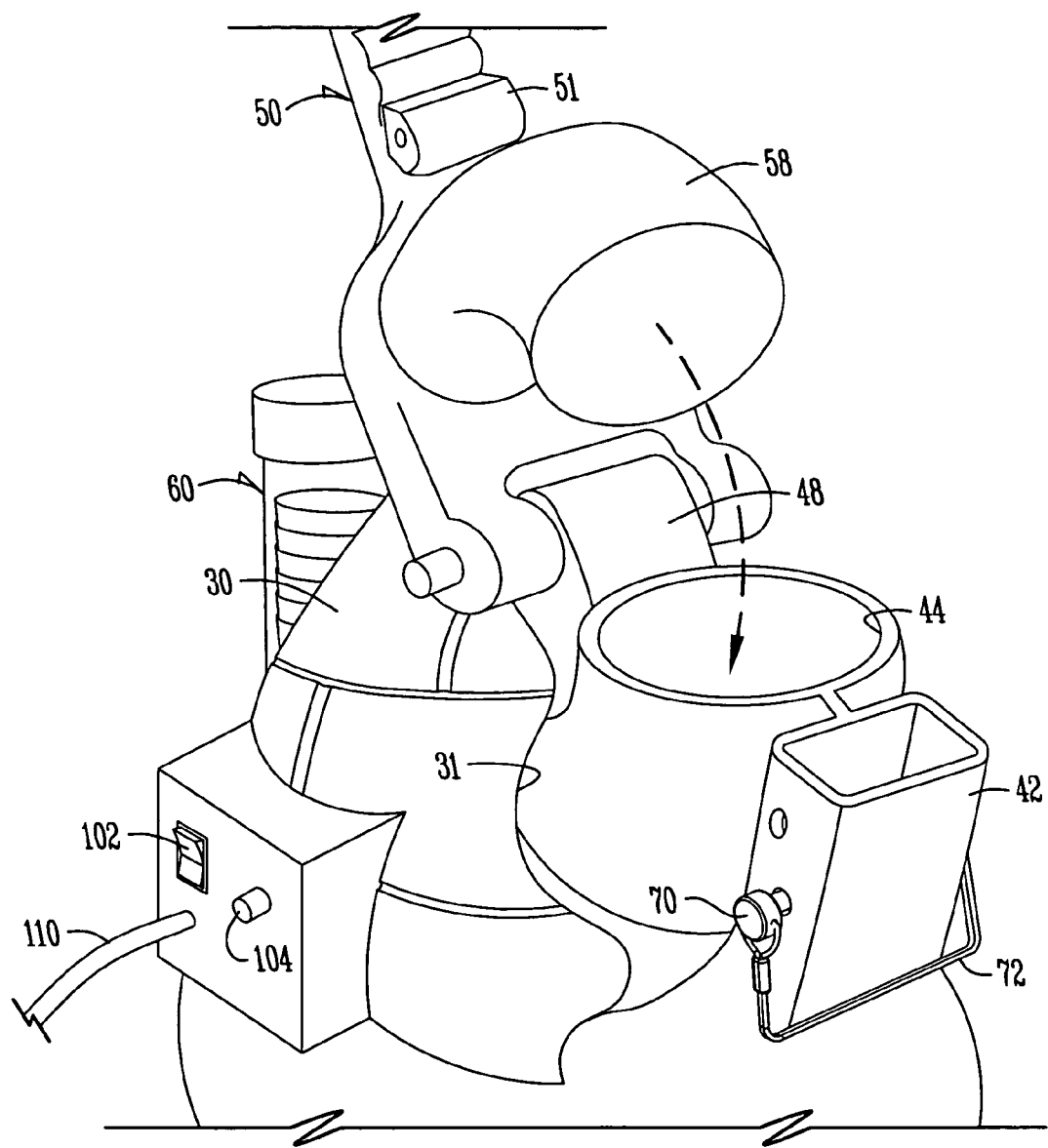

FIG. 11 is a perspective view of the handle and ice ram pivoted away from and raised from the ice feed tube.

Figure 12:
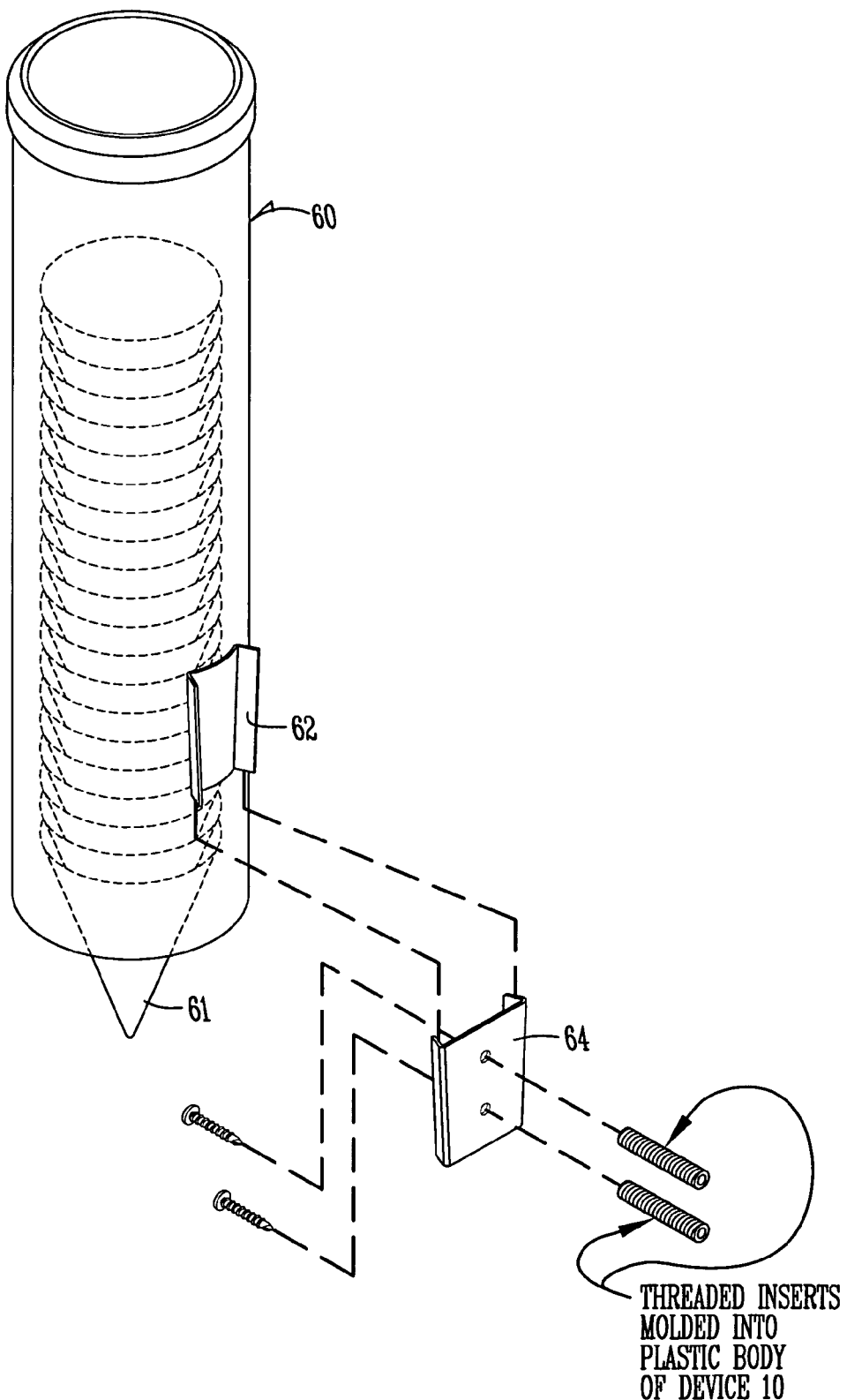

FIG. 12 is a perspective exploded view of the cup holder of FIGS. 2A-F and a mounting bracket for removable mounting to the housing.

IV. DETAILED DESCRIPTION OF EXEMPLARY EMBODIMENT

A. Overview

For a better understanding of the invention, a description of one form the invention can take will now be set forth in detail. Frequent reference will be taken to the accompanying drawings and pictures.

B. Apparatus

The context of the exemplary embodiment is that of a snow cone machine. The context will further be with respect to a snow cone machine that can be placed on a table top or other flat surface and allows an operator to create and temporarily store an inventory of shaved ice so that it is ready for preparing multiple snow cones; yet the size of the machine is such that it is fairly easily portable by one person. However, the invention is not necessarily limited to use as a snow cone machine or table-top versions. Other analogous uses are possible.

1. Device 10 Generally

By referring to FIGS. 1-12, the major components of what will generally be referred to as snow cone machine 10 or device 10 can be seen.

First, the main overall shape of the assembled device 10 is a kind of dome shape with a somewhat flat bottom. The shape is somewhat like a paraboloid (a parabola revolved around its center axis) with flattened sides (compare the front and back views of FIGS. 2A and F with the opposite sides and top and bottom views of FIGS. 2B-E). The rounded surfaces provide a unique and attractive overall shape for the device. It can be molded from plastic. As can be seen from the Figures, the overall basic shape of device 10 is an igloo shape. An iceblock type construction is simulated by grooves molded into the external surface of much of device 10. Note also that indicia such as lettering can be molded onto the external surface of device 10 (see for example, FIG. 2A).

2. Main Housing 12 and Top/Cover 30

The overall shape of device 10 is made up of two primary molded plastic parts. First, what will be called main housing 12 (see different views of it in FIGS. 3A-F) is made of linear low density polyethylene (LLDPE, e.g., Exxon Mobile 8555, FDA compliant for snow-cone type uses), which is rotationally molded. Its bottom 14 has four molded, downward extending bosses to which feet 16 are attached. Feet 16 (approx. 1½ inch dia.) could be made of relatively high coefficient of friction, soft rubber (e.g., styrene butadiene rubber with a Shore A durometer hardness of 70). They could be fixed to the bosses by stainless steel bolts extending through openings in bottom 14. Sealing gaskets could be used around the bolt heads at their abutment with bottom 14 of housing 12. The feet would provide a relatively high co-efficient of friction to hold device 10 in place on most surfaces, but also provide sufficient support for the whole device 10. They would also provide some vibration damping. Note, for example at FIG. 2D, how feet 16 are placed near the perimeter of bottom 14 of housing 12, and how bottom 14 is elongated in the side-to-side direction as opposed to the front to back direction. This provides good side-to-side stability on a surface.

Second, what will called top or cover 30 (see different views of it in FIGS. 5A-F) is removably attachable (e.g. by screws) to the ceiling 15 of main housing 12. It completes the dome or igloo look of device 10. It also encloses a motor 80 and includes a control panel for operation of device 10. It can be molded and of the same material as main housing 12. When attached to main housing 12, the two pieces look integrated—like a one piece housing.

a) Wheels 18

A pair of wheels 18 (e.g. relatively hard plastic, approximately 3 inch dia.) is rotatably mounted on one side of housing 12 at or near bottom 14. Wheels 18 are rotatable on stainless steel shoulder bolts (that act as spindles) that are turned into threaded inserts that are molded into or placed in main housing 12. Device 10 can be placed on feet 16 on the surface of a table and wheels 18 would be slightly off the plane of that surface (see reference numeral 91). This provides a relatively wide, four footed base, with high coefficient of friction, but allows easy portability by simply tipping device onto wheels 18, and then rolling it across a surface or floor.

b) Ice Cavity or Cabinet 20

Figure 2A:
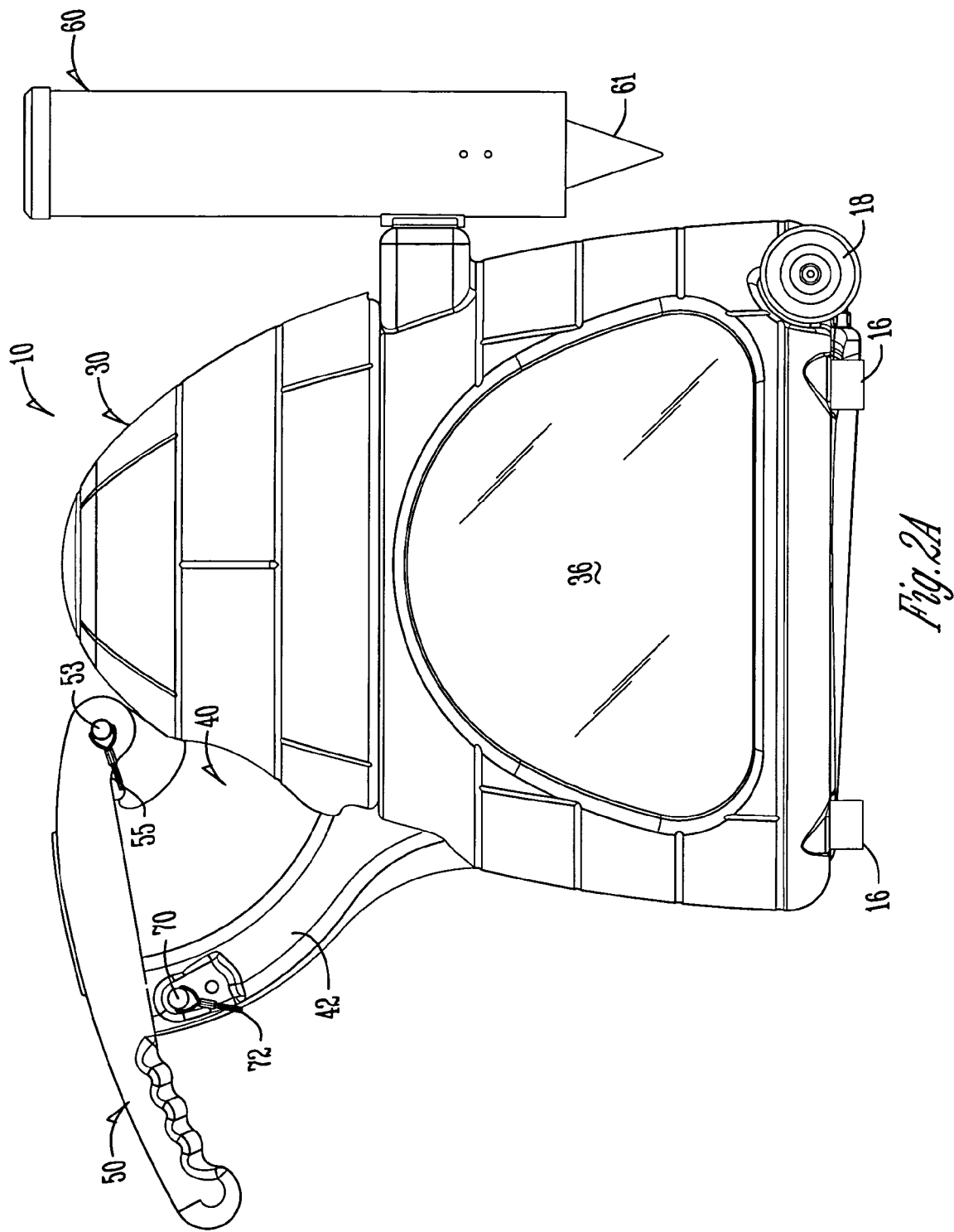
FIG. 2A is a front elevation of FIG. 1.
Figure 2B:
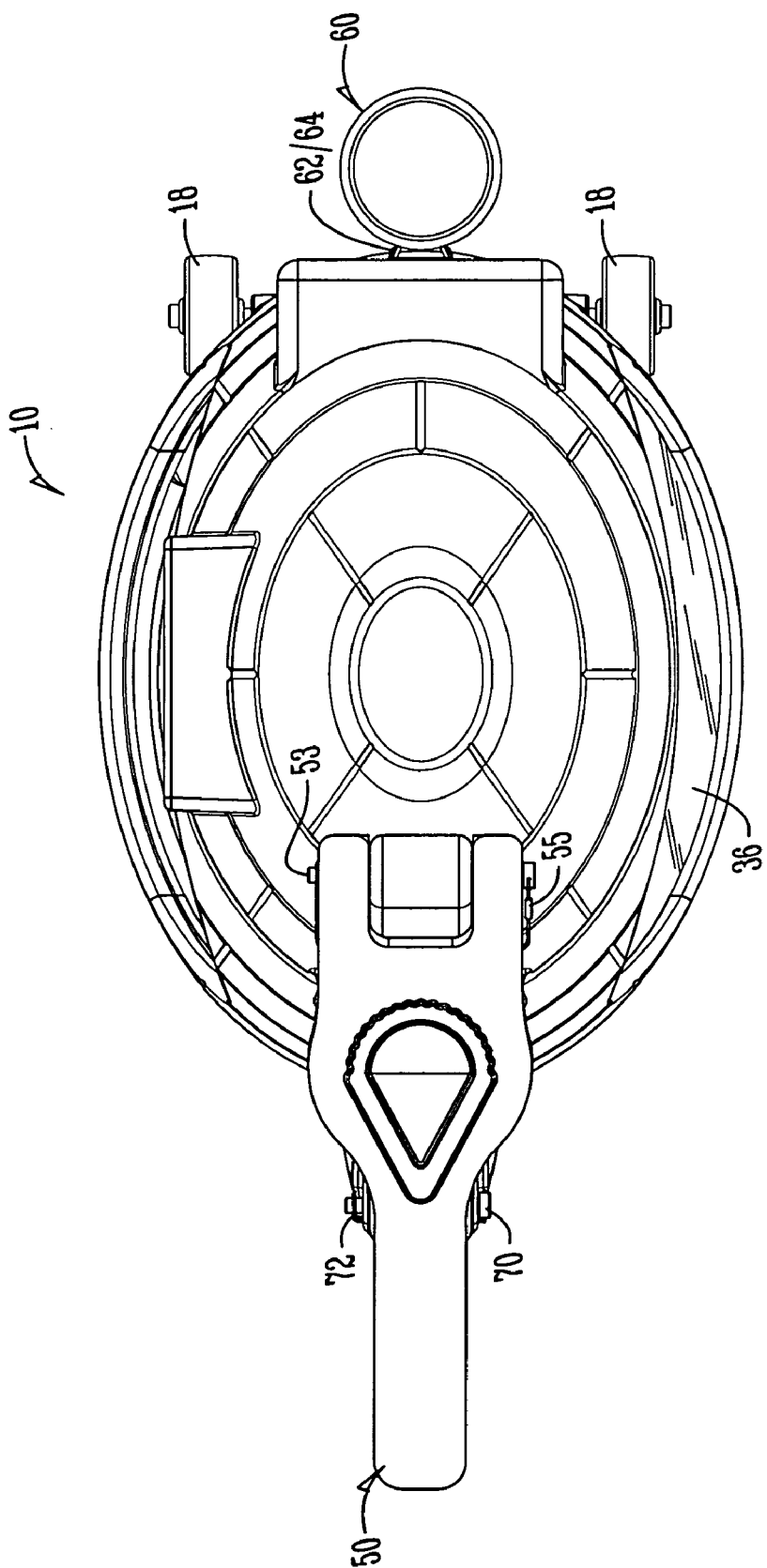
FIG. 2B is a top plan view of FIG. 1.
Figure 2C:
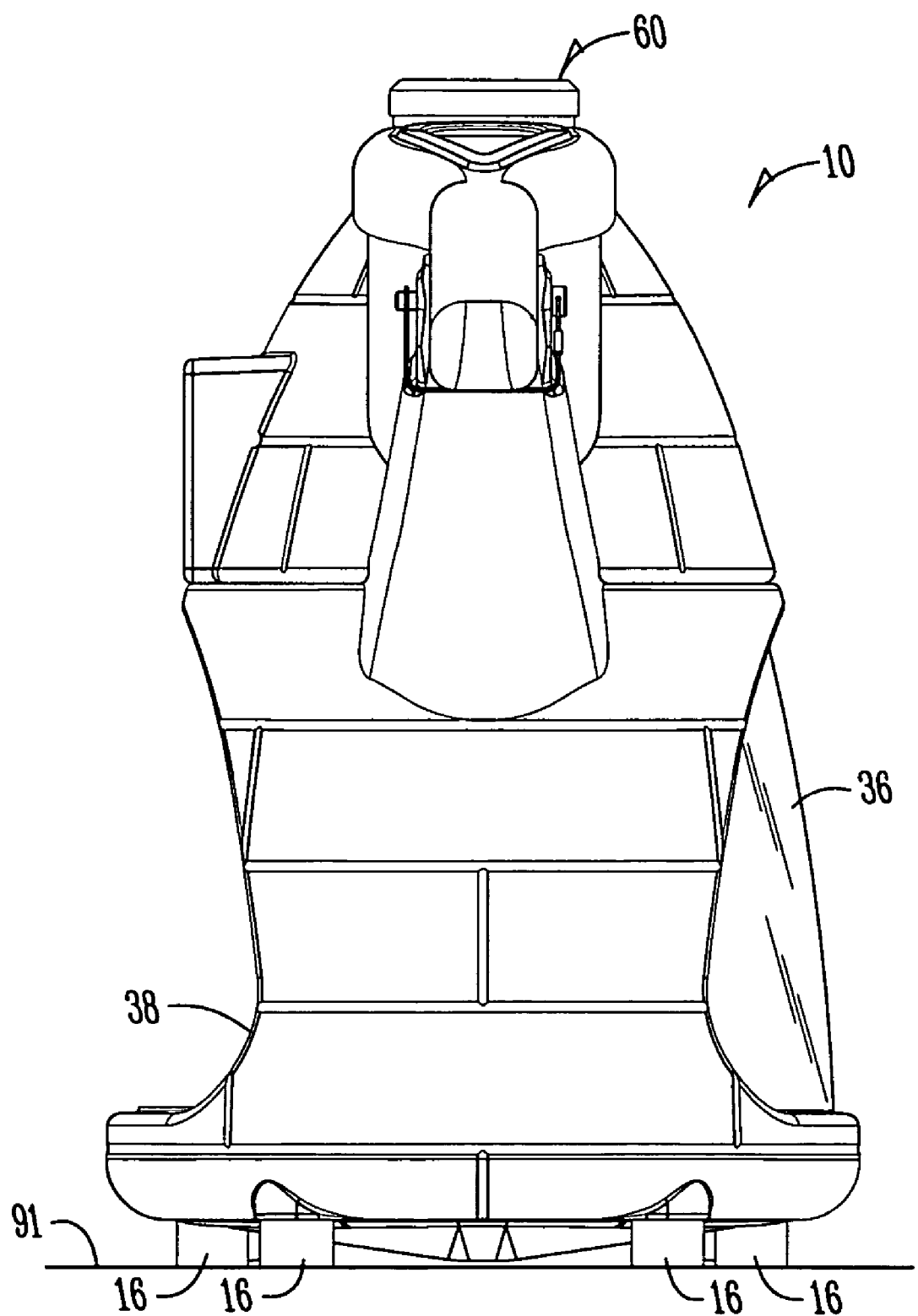
FIG. 2C is a left side view of FIG. 1.

What is called an ice cavity or cabinet 20 is defined in the interior of main housing 12. It is defined by bottom 14, back vertical side 22, front vertical side 24, right side 26 and left side 28, and a top or ceiling 90 (see, e.g., FIGS. 3A-F). It provides a short term or temporary storage location for an inventory of shaved ice, ready for dispensing. As can be appreciated, the interior of main housing 12 is substantially enclosed. This blocks access other than through the operator opening 38 in back side 22. The size of this ice cavity or cabinet 20, however, is designed, in this embodiment, to be large enough to hold a substantial inventory of shaved ice. The plastic also has some insulating qualities and thus allows the operator to work ahead and produce (if desired) an inventory of shaved ice that would be ready to make multiple servings of snow-cones. The opening 38 is shaped somewhat similar to the shape of device 10. By referring to FIG. 2C, you can see how opening 38 provides access somewhat from the sides of main housing 12 as it wraps around towards both sides. Similarly, FIG. 2C shows how window 36 wraps around towards both sides providing some view of the interior or ice cavity or cabinet 20 even a bit from the sides.

c) Window 36

A front opening 32 in main housing 12 is surrounded by a slightly recessed flange 34. A transparent, tinted, or translucent window 36 fits in the opening with its perimeter seating against flange 34. A silicone sealant/adhesive is used between polycarbonate window 36 and flange 34. When it sets up, window 36 is sealingly adhered into opening 32 all around its perimeter. An example of a sealant adhesive is an RTV sealant (e.g. Dow Corning 732 Multi Purpose Sealant). It is a commercially available product having food zone safety characteristics. Window 36 is ⅛ inch thick vacuum-formed polycarbonate with a slight blue tint.

A similar-shaped opening 38 in the back side 22 of housing 12 has a molded ridge of increased thickness surrounding it for structural rigidity. Opening 38 allows operator-access into the ice cavity to remove and dispense ice from it. The left and right sides 26 and 28 of main housing 12 are continuous, as is ceiling 90. Therefore, the ice cavity is essentially enclosed except for the back opening 38.

The shape of openings 32 and 38 are similar. They somewhat follow and evoke the dome shape overall shape of device 10. They allow convenient access on one side to the ice and convenient viewing of the ice cavity from the other side.

d) Drain 94/Recessed Drain Tube 96

Bottom 14 of main housing 12 has a special configuration for efficient drainage of water from ice cavity 20. A drain opening 94 (approx. ½ inch dia.) exists at the lowest point of bottom 14. Bottom 14 has several different portions which are sloped in different directions, but all slope towards a threaded drain opening 94. As can be seen in the drawings, bottom 14 functions not only to support ice in ice cavity 20, but also as a drain pan. It is sloped from left side down to right side, but also from front side to center and back side to center. A drain tube 96 is threadable through threaded drain opening 94 and extends slightly into ice cavity at one end and extends for a longer distance outside of ice cavity 20 at the other end. The exterior of the outer end of tube 96 has standard hose fitting barbed ridges for connection to a standard hose to carry melted ice in fluid form away from device 10.

In particular, note that tube 96 is recessed into floor 14 (see hemispherical recess 98 in floor 14) and does not extend beyond the perimeter of housing 12. It is therefore substantially protected and concealed to deter damage to it.

FIGS. 1 and 10A and B illustrate one way of forming bottom 14 to create this draining function. As indicated in FIG. 1, floor 14 could be sloped in two directions; first, as indicated by line 93, floor 14 could be sloped from left to right towards drain opening 94. In otherwords, fluid that might accumulate in the bottom or floor 14 of ice cavity 20 would, when device 10 is placed on a relatively level horizontal surface, would flow by gravity towards the side with drain opening 94. Additionally, lines 95 in FIG. 1 are intended to indicate floor 14 could be sloped from front and back of main housing 12 towards the middle side where drain opening 94 exists. In combination, this double sloping of floor 14 would encourage fluid by gravity to flow from the left side in FIG. 1 towards the right side in FIG. 1, but also from front and back towards the middle of the right side, so that fluid would converge towards drain opening 94. This can all be accomplished in the original molding of main housing 12. This complex shape can be created as a part of that unitary piece 12.

As can also be seen from the drawings, however, drain 94 cooperates with drain tube 96 in a manner that is both above the plane of the distal ends of feet 16. Tube 96, at the same time, is recessed from the right side of main housing 12 in FIG. 1 so that it does not stick out and be subject to damage. As seen in FIG. 2E, main housing 12 can be molded to provide an indented portion spaced around tube 96 to allow it to be recessed up away from the plane of the distal surfaces of feet 16, yet cooperate with sloped drain pan or floor 14 to provide a gravity drain from main housing 12.

Figure 2D:
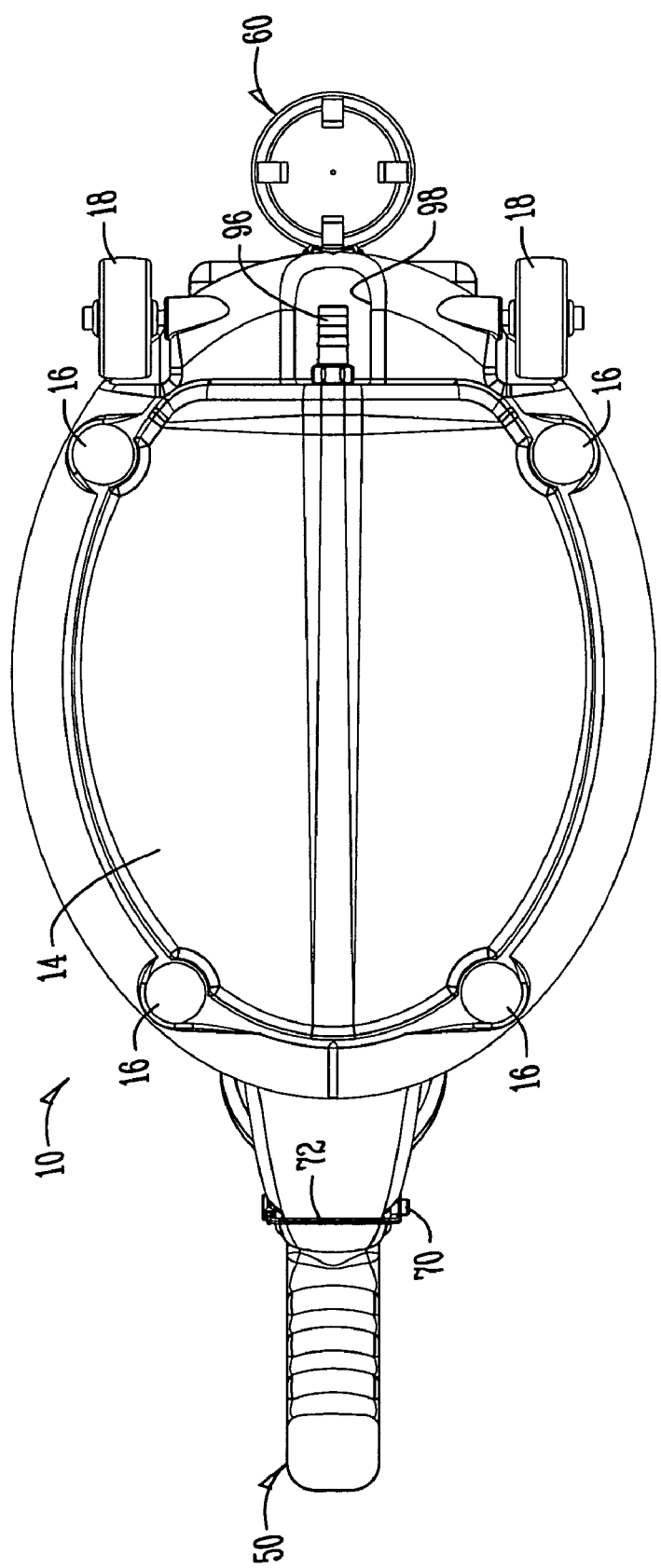
FIG. 2D is a bottom plan view of FIG. 1.
Figure 2E:
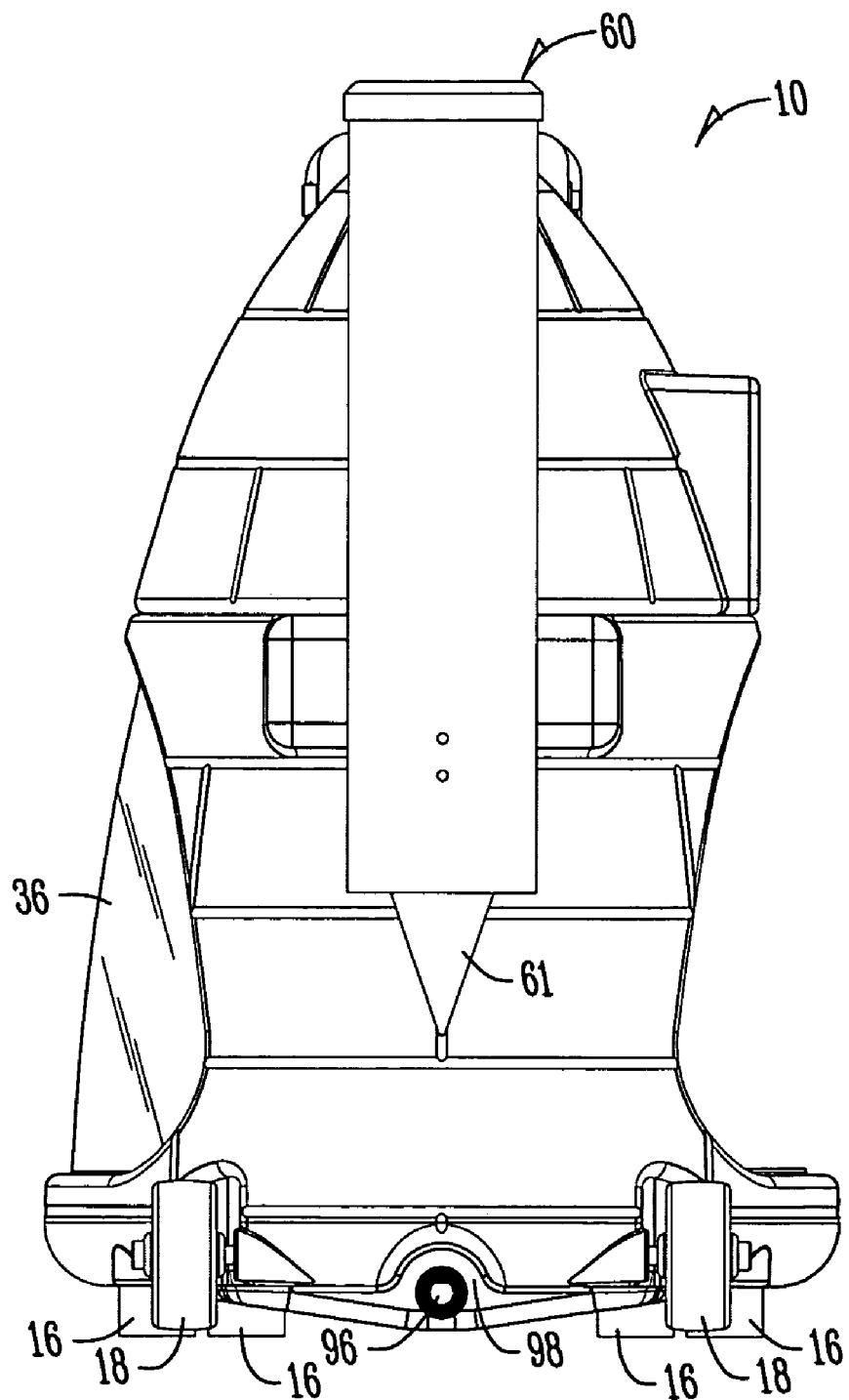
FIG. 2E is a right side view of FIG. 1.
Figure 2H:
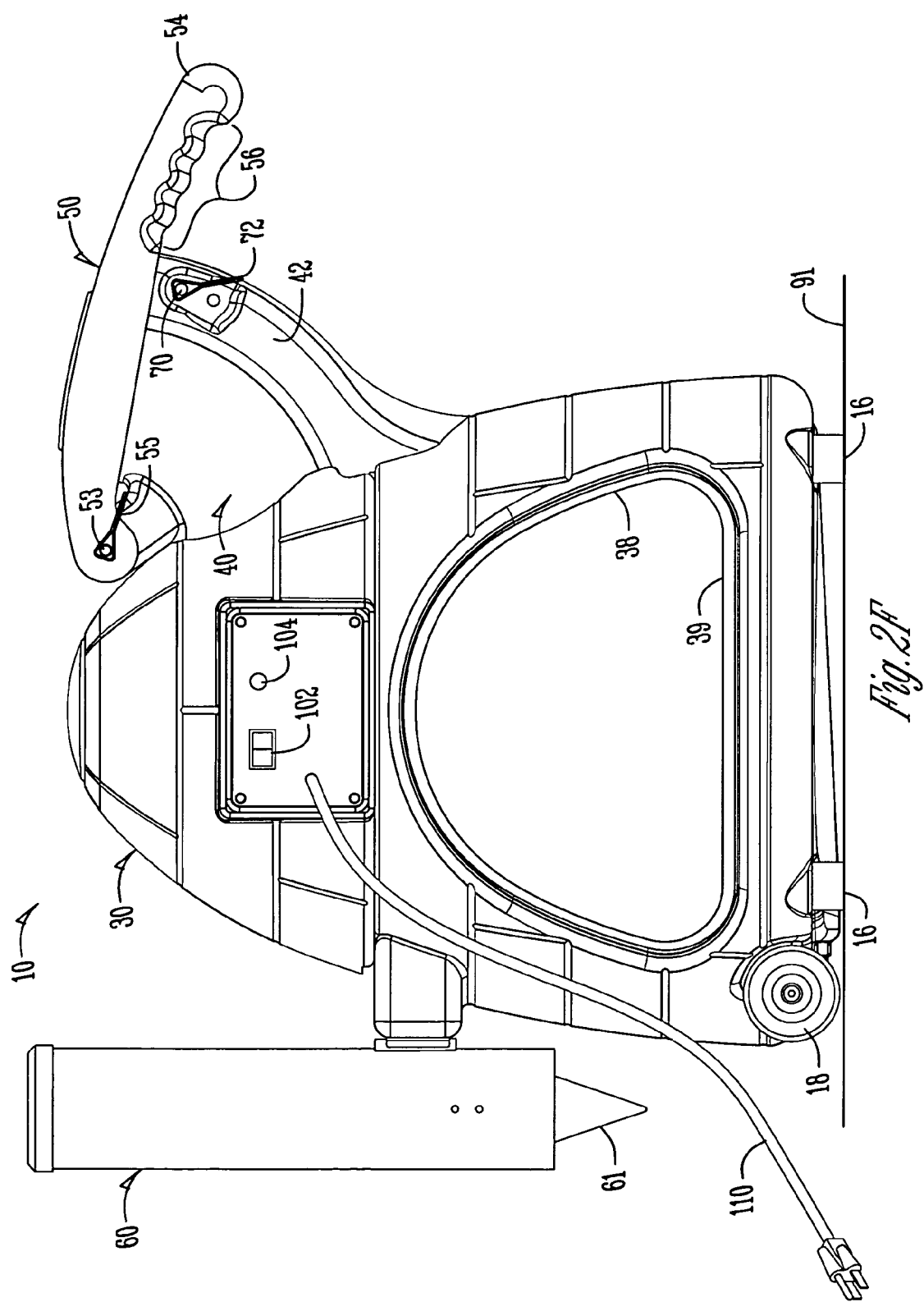
FIG. 2F is a back elevation of FIG. 1.

FIG. 2D shows how the distal end of tube 96 is recessed from the side of main housing 12. However, it is reasonably easily accessible to hook up a standard sized hose fitting to route a drainage hose away from device 10.

e) Ice Feed Tube 40/Ice Ram and Locking Handle 50

An ice feed tube 40 extends outwardly and upwardly from the left side 28 of housing 12. It is a part of main housing 12 and curves upwardly to an opening 44. An integral tubular support 42 (also a part of main housing 12) extends underneath it and connects to tube 40 by web or wall 43. Support 42 therefore provides structural support for ice feed tube 40. Support 42 is generally hollow (it has an open top end 46) and follows the curve of tube 40. Tube 40 is generally hollow between outer opening 44 and its inner end, which is in communication with ice cavity 20. This forms a path for ice to move. As will be discussed further later, a rotating chopper head 83 is positioned along the path to shave, chip, chop, or crush ice, which then drops by gravity into ice cavity 20.

An integral pivot arm or support 48 (see FIGS. 3A-F) extends at an angle from the top of ice feed tube 40 and is adapted to pivotally support a separate handle 50.

Handle 50 (see different isolated views of it at FIGS. 4A-F) is pivotally attached (see parallel arms 52) to pivot arm 48 by a pivot pin (e.g., metal). Its opposite end has a formed knob 54. A four finger grip 56 is formed along the lower part of handle 50, as is what will be called an ice ram 58. It is about sixteen inches long from pivot axis to end of knob 54. Grip 54/56 extends laterally and clear of the remainder of device 10 and is easily graspable. The length provides a substantial lever arm.

Grip 54/56 is ergonomic. It has a four-finger grip if the user grasps and wraps the fingers around that end of handle 50. The rounded knob, somewhat enlarged size, helps keep the fingers on the handle. Alternatively, the rounded knob 54 could be gripped like a ball in a person's hand to pull or push the device on its wheels when tipped on its wheels.

Ice ram 58 has a diameter and shape which closely conforms with the inner diameter and shape of ice feed tube 40. Handle 50 can be pivoted to move ice ram 58 into and out of ice feed tube 40. When moved sufficiently up, ice ram 58 moves out of tube 40 (see FIG. 11) and exposes opening 44 of ice feed tube 40. Ice cube(s) or block(s) can be inserted into opening 44 to fill part or most of ice tube 40. Handle 50 is then pivoted down so that the distal end of ice ram 58 enters ice feed tube 40. As is conventional with these types of machines, continued downward pivoting of handle 50 would move ice ram 58 further into ice feed tube 40 to push the ice against a rotating blade along the pathway between ice feed tube 40 and ice cavity 20. This allows the ice to be pushed against the rotation blades to create the shaved, chipped or crushed ice that falls into cavity 20 by gravity through an opening (not shown) in ceiling 15 of main housing 12. By referring to FIGS. 3A-D, it can be seen how ice tube 40 is tubular, having a distal opening 44. Its opening extends to ceiling 15 of main housing 12 where there is an opening in communication with the ice cavity or cabinet 20 such that shaved ice drops by gravity into cabinet 20.

Handle 50 also has a projection 51 with a through-bore that is molded into handle 50. Handle 50 is separate from main housing 12 and cover 30 but could be molded and of the same plastic. Support 42 can have two aligned sets of openings 74 and 76 adapted to receive a pin 70 there through. When handle 50 is in a down position like in FIGS. 2A-F, projection 51 of handle 50 enters opening 46 in support 42. A through-hole through projection 51 aligns with top set of openings 74 in support 42. Locking pin 70 (e.g. three inches long, stainless steel) can be pushed through aligned openings in support 42 and projection 51 to lock handle 50 in place relative to main housing 12. A conventional captured spring retainer 72 can be moved in place to keep pin 70 in place. With handle 50 locked in place, handle 50 can essentially be used to tilt up the left side of housing 12 and then pull device 10 on wheels 18. Or, it could be used to lift the left side of housing 12 with one hand. The other hand could grab a part of the opposite side of housing 12 and the whole device 10 could be manually lifted an moved (i.e. from on top of a table to the floor, or from the table to a car or truck). The portion to which cup holder 60 is mounted could be grabbed.

To operate device 10 for snow cones, locking pin 70 is removed from openings 74 to release handle 50. Locking pin 70 can then be inserted into set of lower openings 76 in support 42 and retainer 72 put in place. This is basically a storage position for pin 70 until it is desired to lock handle 50. It allows handle 50 to pivot up and down according to desire.

As can be seen in the Figures, support 42 can be molded and be integral with main housing 12 as well as with ice feed tube 40. Cover 30 can fit around those members. By placing support tube 42 and making its dimensions and wall thicknesses appropriately, it adds structural support with ice tube 40 on the opposite side of pivot axis for handle 50, and in the direction that handle 50 and ice ram 58 will generally be moved when the operator pushes ice against chopper head 83. Support 42 thus not only supports ice tube 40, but provides support relative to the forces that will be experienced because of pressing handle 50 and ice ram 58 to in turn press ice against chopper head 83.

f) Motor 80/Electrical Circuit 100

Top cover 30 of housing 12 is removable by stainless steel screws into molded in threaded inserts in cavity ceiling 90. It can surround and enclose an electric motor 80 (e.g., Baldor Part No. 17E245W108G1, 1725 RPM, Class B, Code L, SF 1.15, continuous duty, 40 deg. C. ambient, 0.33 horsepower, standard AC, capacitor start). Motor 80 (see FIG. 8) would have a rotating axle or shaft 82 that extends through a complimentary opening 86 in main housing 12 (see FIG. 3E) to a position adjacent the ice path defined by ice feed tube 40. Chopper head 83 (see FIGS. 6A-E—sand cast and machined aluminum) can be mounted concentrically to motor shaft 82 by a set screw or other means. A set of two stainless steel blades 84 (see FIGS. 7A-B) can be mounted by screws on the distal surface of chopper head 83 in a conventional configuration for shaving or chopping ice.

Figure 3A:
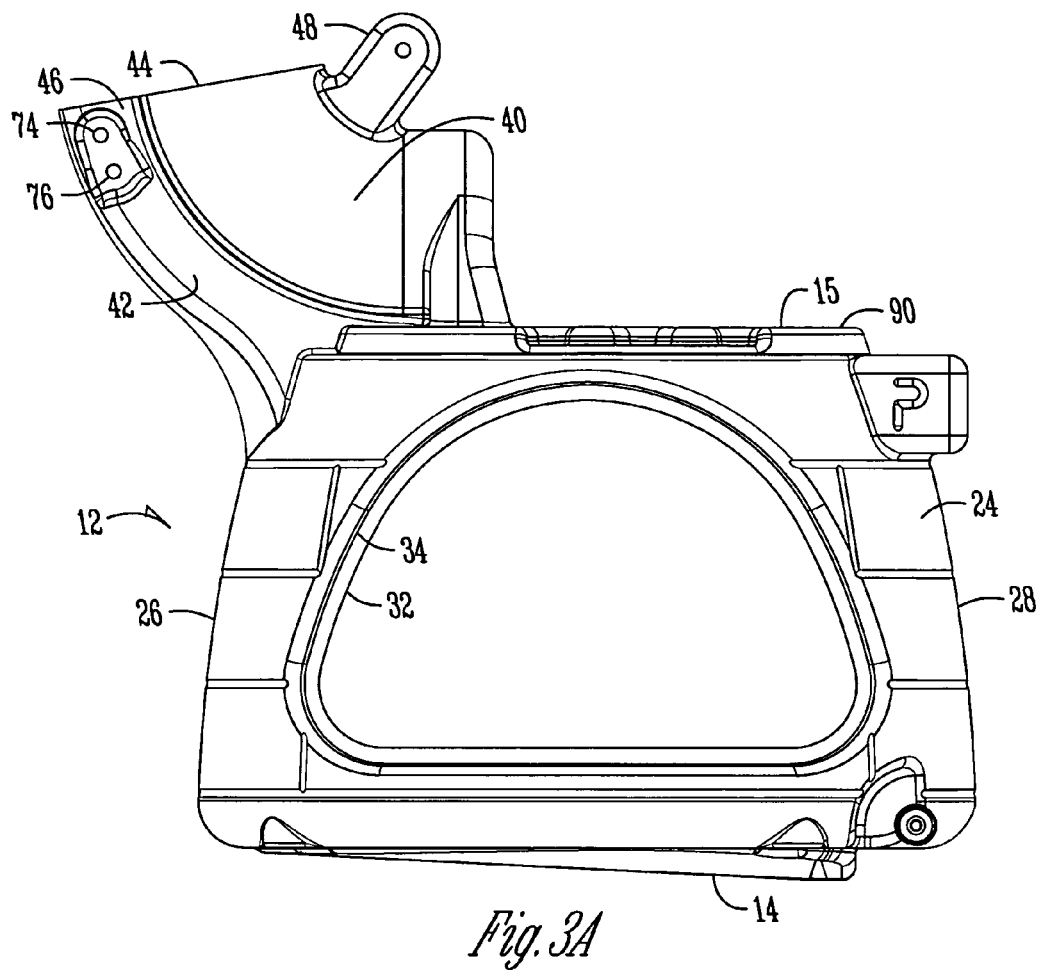
Figure 3B:
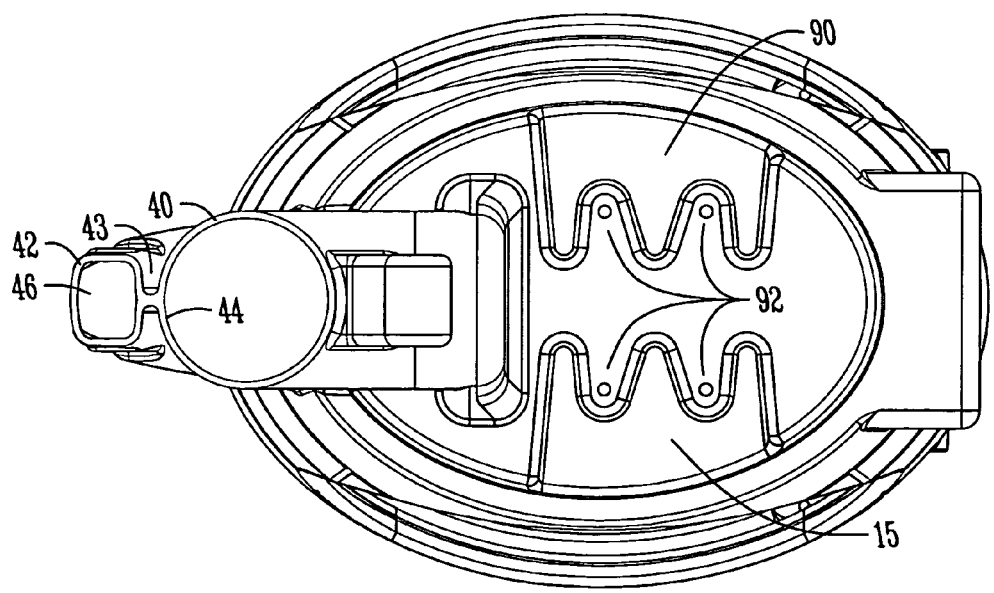
Figure 3C:
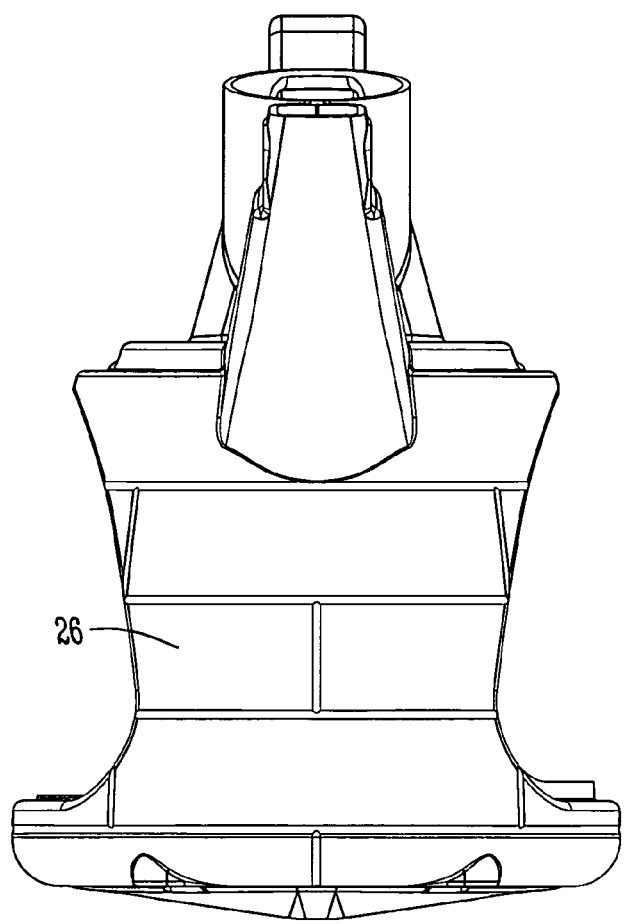
Figure 3D:
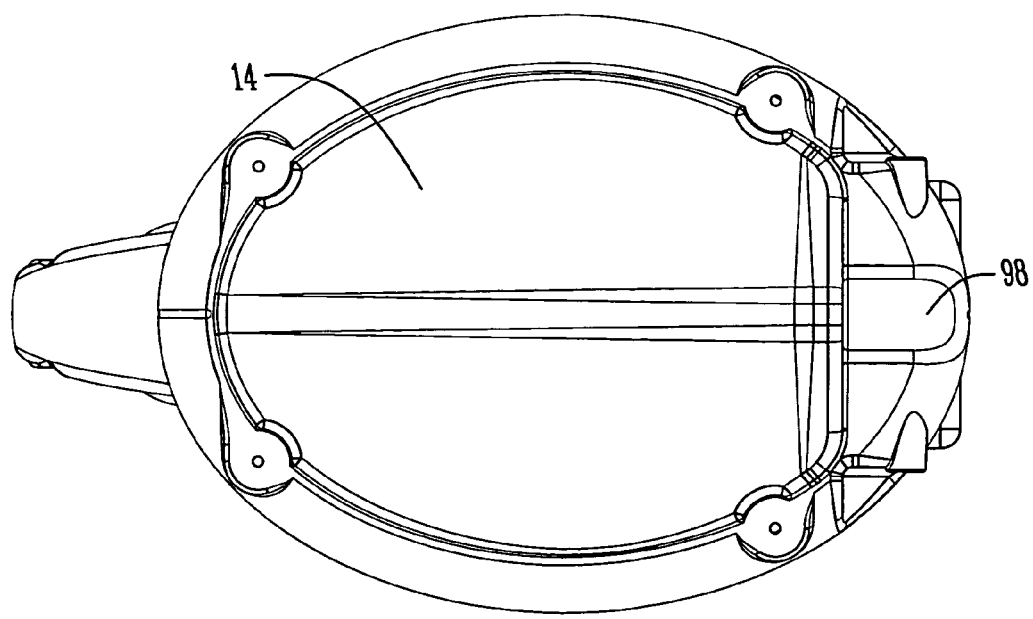
Figure 3E:
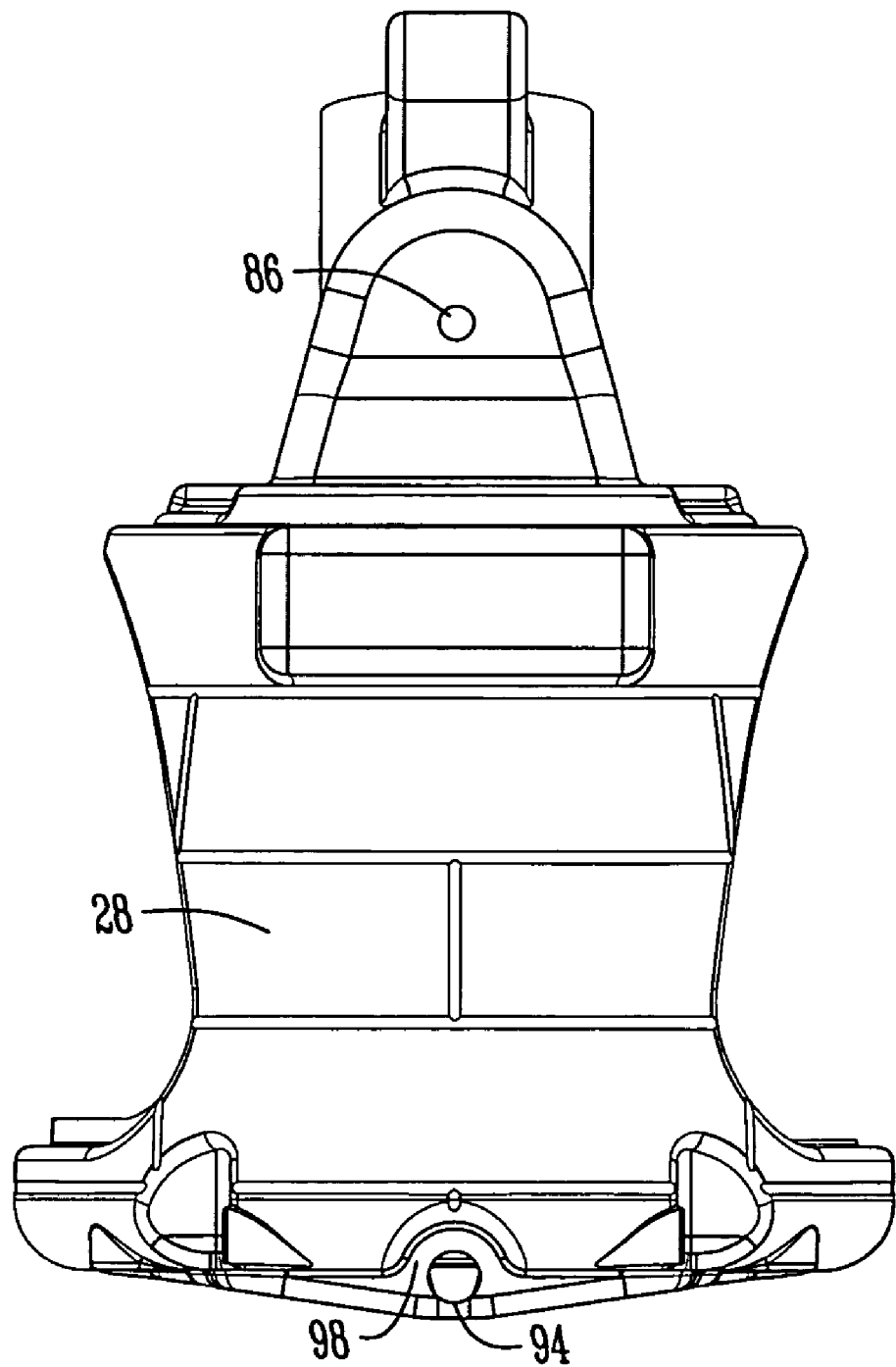
Figure 3F:
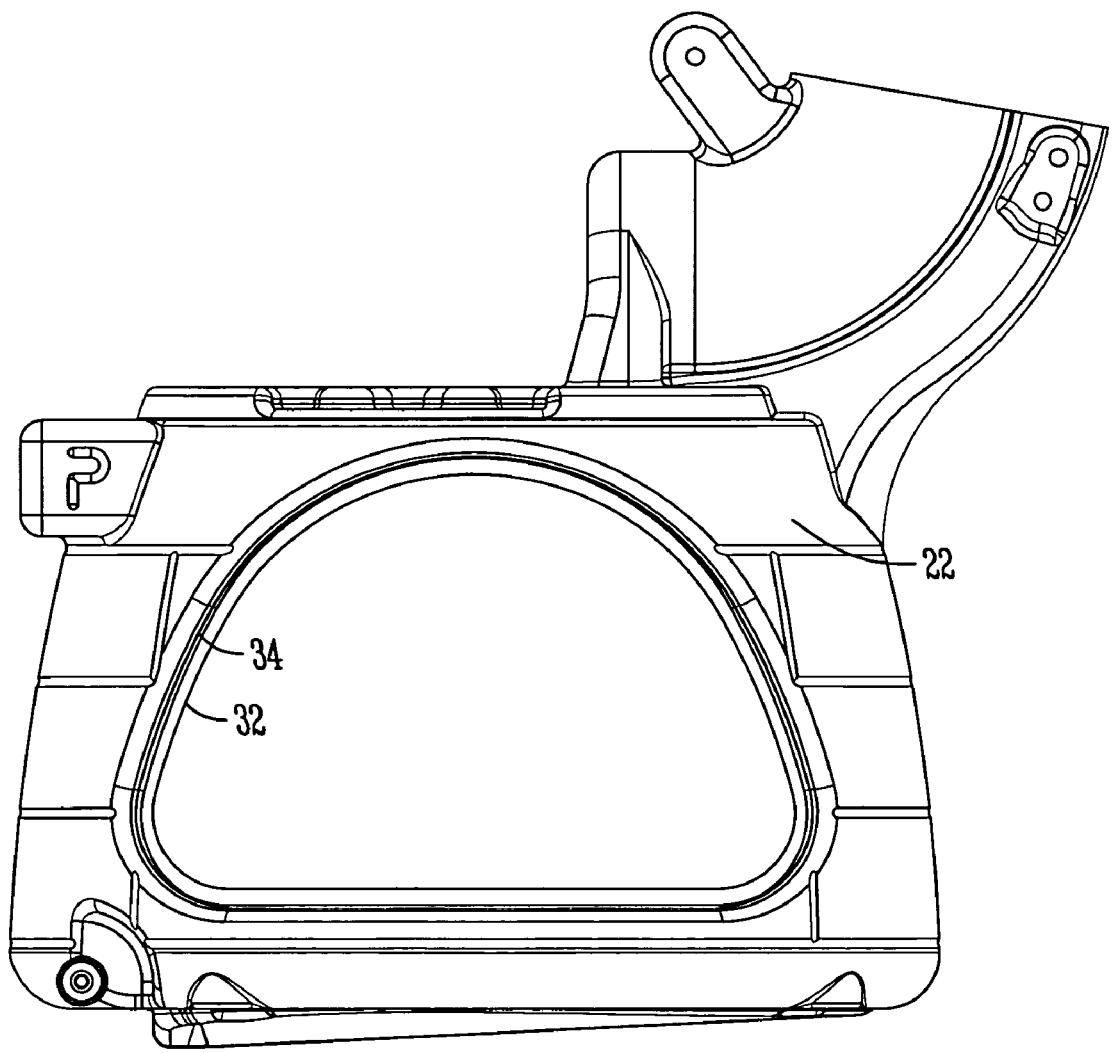
Figure 4A:
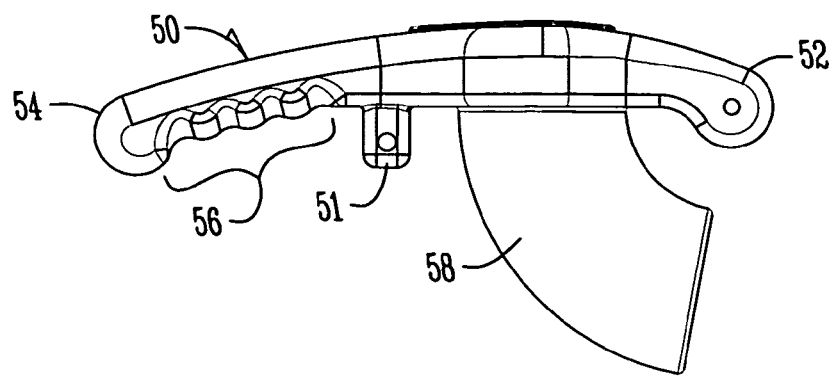
Figure 4B:
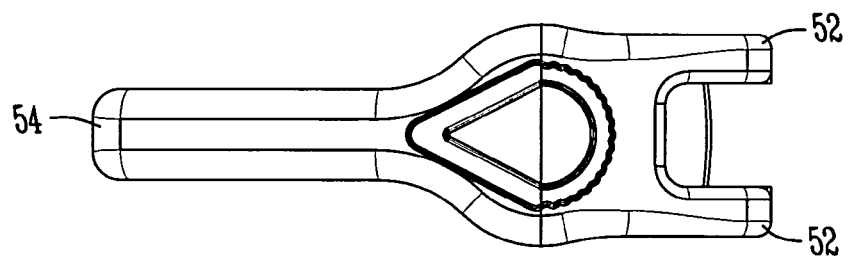
Figure 4C:
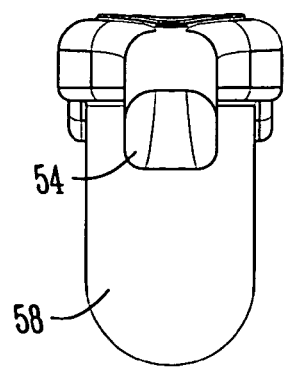
Figure 4D:
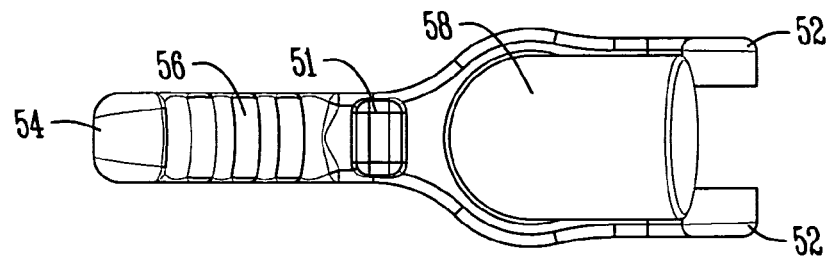
Figure 4E:
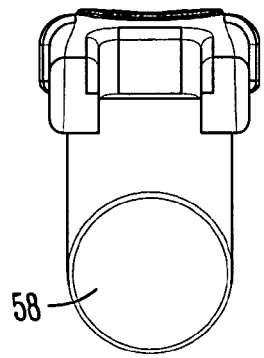
Figure 4F:
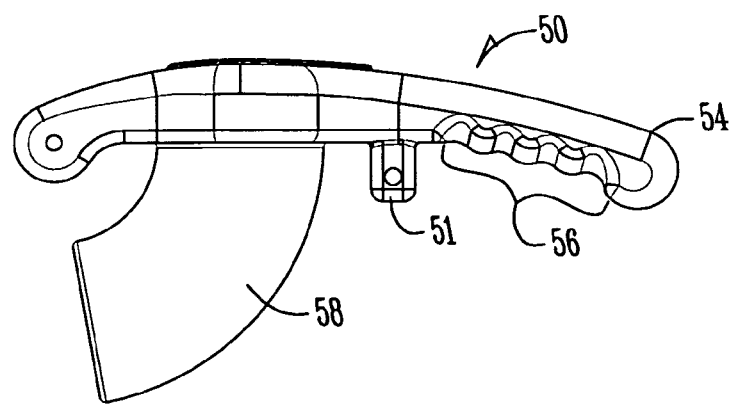
Figure 5A:
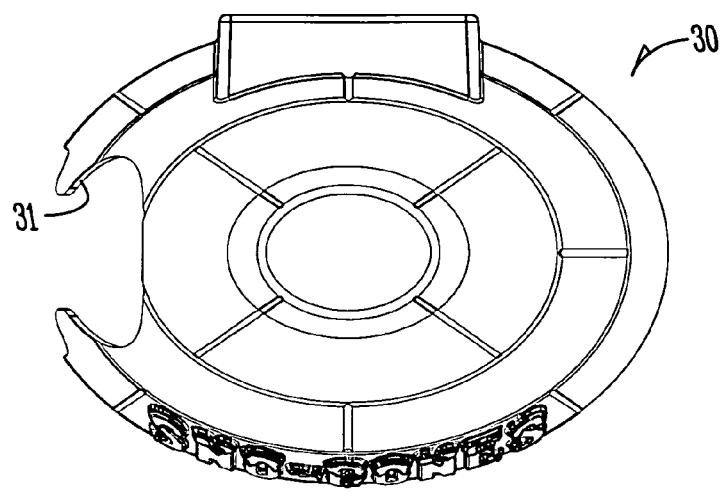
Figure 5B:
Figure 5C:
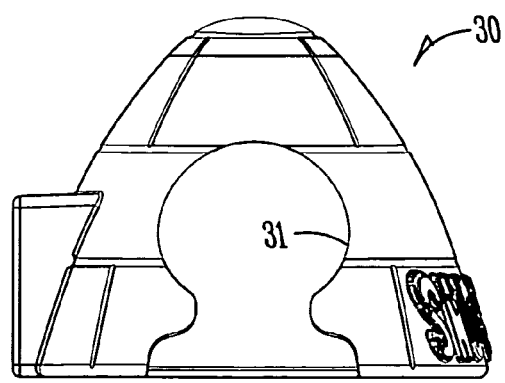
Figure 5D:
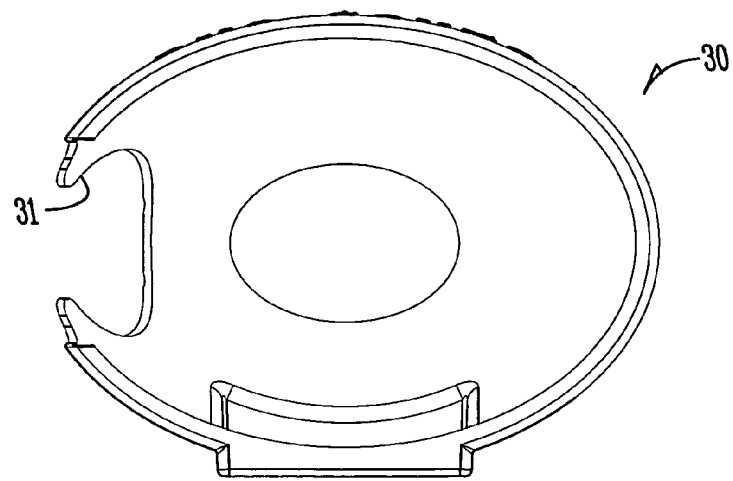
Figure 5E:
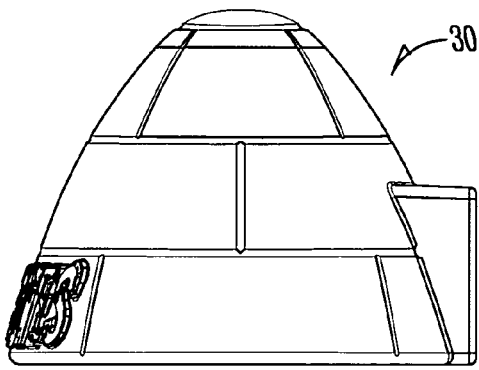
Figure 5F:
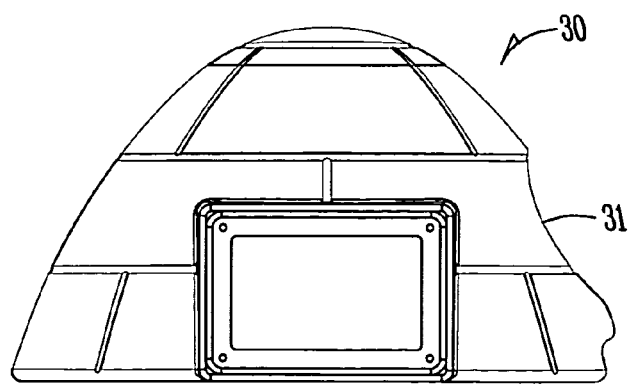
Figure 6A:
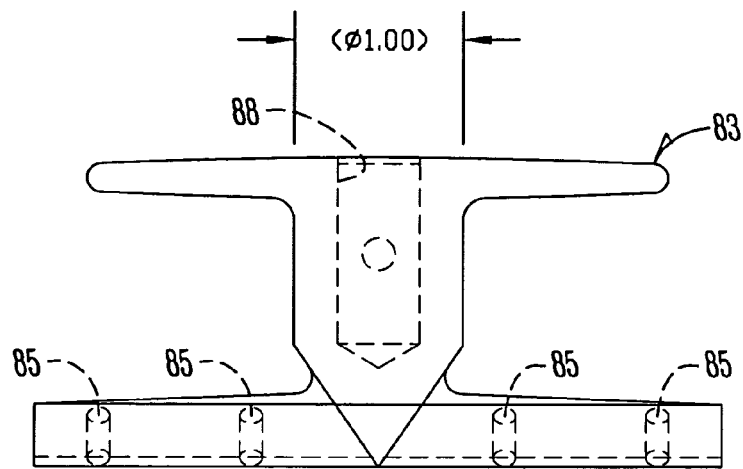
Figure 6B:
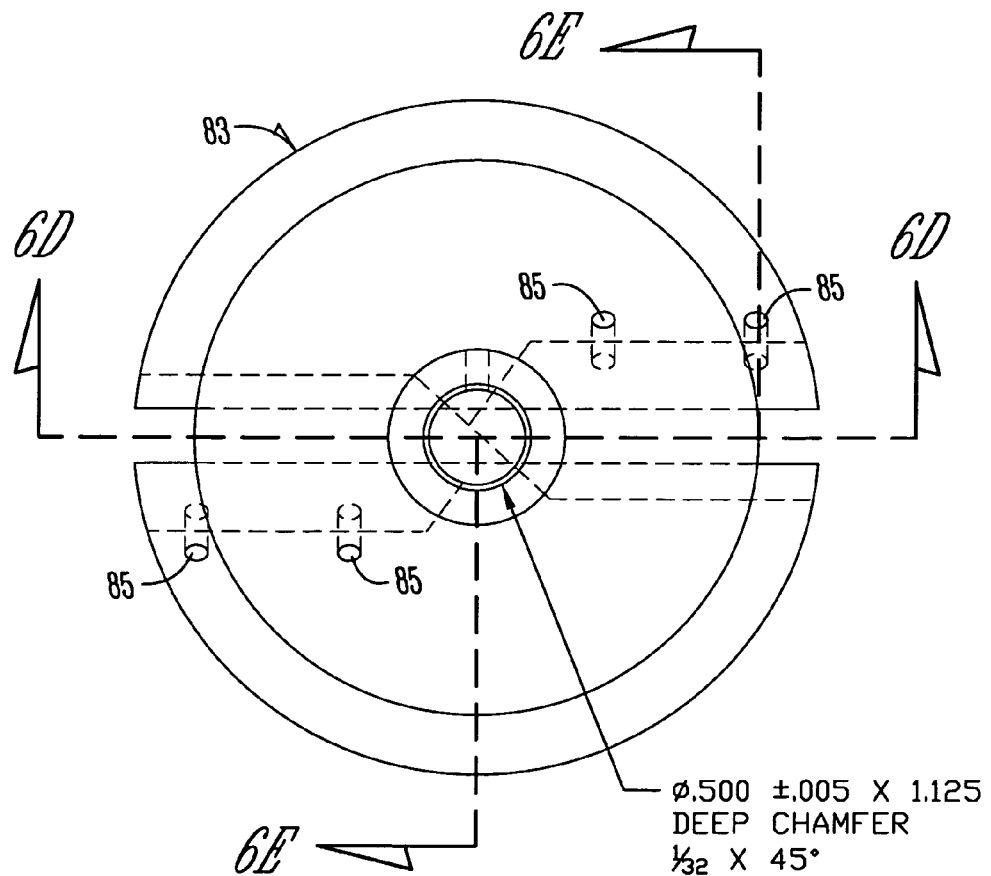
Figure 6C:
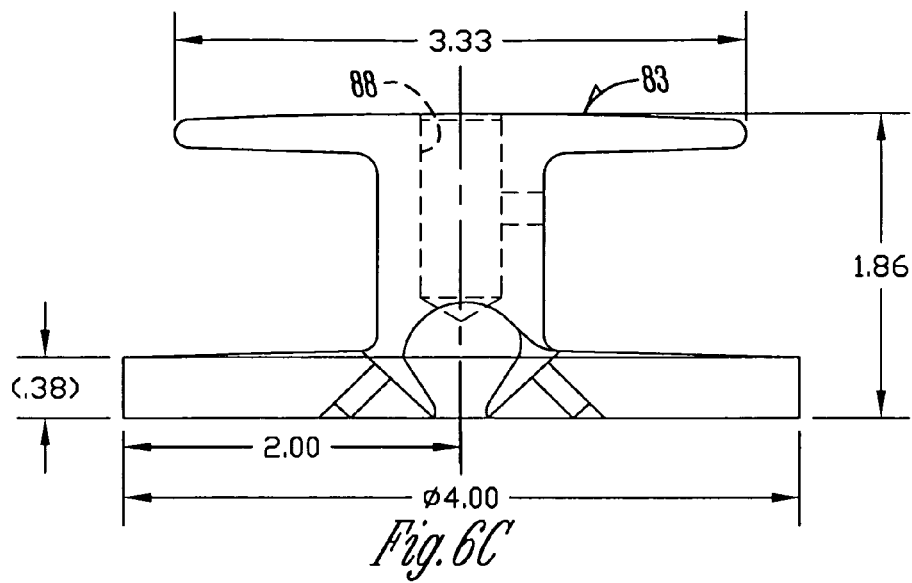
Figure 6D:
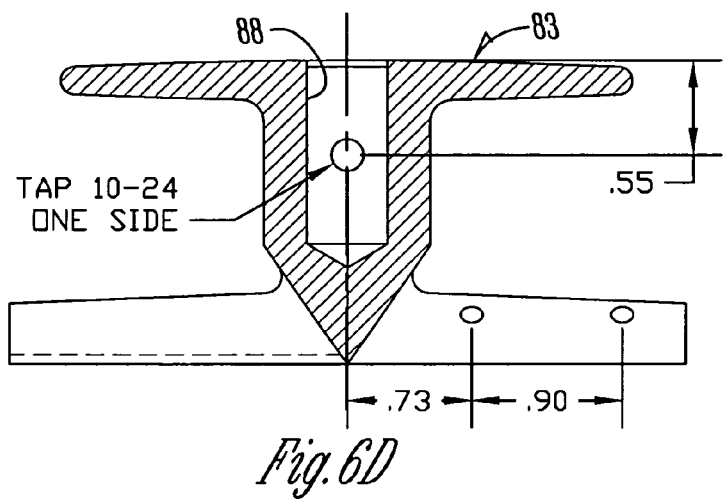
Figure 6E:
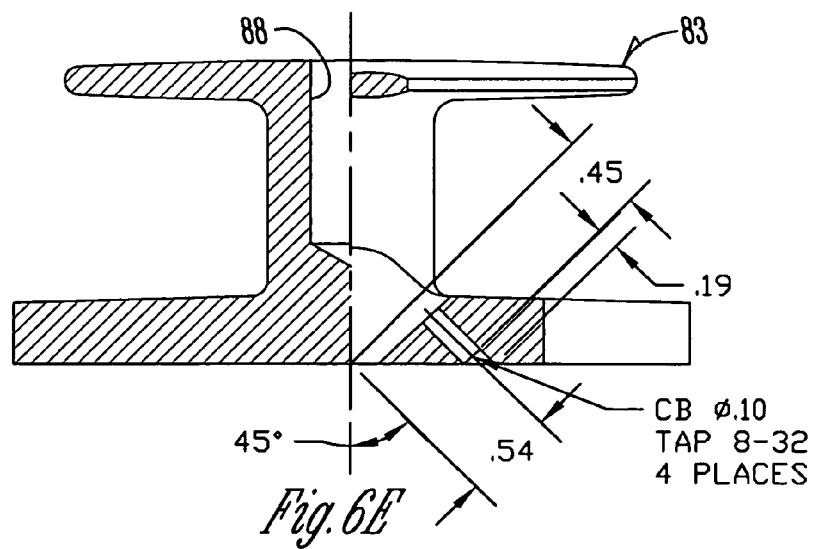

As shown specifically at FIG. 3B, mounting pads 92 are raised portions in ice cavity ceiling 90 and can be thicker sections that support the motor and allow it to be screwed or bolted into place. Top or cover 30 can then be placed over it to give a unitary dome shape appearance to main housing 12. As can be appreciated, the rotating axle 82 of motor 80 would extend through small opening 86 (FIG. 3E). Chopper head 83 would be installed on axle 82 by sliding head 83 onto axle 82 at bore 88 of chopper head 83 and secured, for example, by a set screw. Chopper head 83 would be positioned along the path of ice feed tube 40. Blades 84 would be screwed into position at locations 85 (see FIG. 6B) and at an angle such that when ice is pressed against the rotating surface of chopper head 83 containing blades 84, ice is shaved or chipped and falls into ice cabinet 20 by gravity. This arrangement places motor 80 outside of ice cabinet 20 and outside of ice feed tube 40, but places chopper head 83 and blades 84 in ice feed tube 40. Access and replacement of blades 84 can be made simply by reaching through ice feed tube 40, as can removal of chopper head 83, if needed.

An electrical circuit 10 can be installed on the inside of cover 30 and includes a conventional momentary switch 102 accessible by the operator (see FIGS. 2F and 9). A reset switch 104 functions as follows. A momentary switch 102 is used for operation of chopping head 83 so that the operator has to push and hold switch 82 to rotate blades 84. When the operator releases switch 102, rotation of blades 84 would stop. If the motor jams because the blade is jammed against ice in ice feed tube 40 (or any other reason), the circuit will sense an over-current condition (for example, an over-current sensor combined with a circuit breaker in component 104, such as are commercially available and well known) and disconnect power to the motor even if momentary switch 102 is pressed. This disallows any operation of motor 80 until reset switch 104 is manually pushed. This would allow feedback to the operator that the blade is likely jammed and allow him/her to use appropriate measures to remove any jammed ice to free the blade. It requires the affirmative manual act of hitting the reset switch and then the momentary switch to test if the blade now operates.

Leads 106 and 108 go to motor 80. This circuit can be enclosed within top 30 to keep it away from any moisture. FIG. 9 provides an electrical schematic of circuit 100.

The circuit 100 senses when motor 80 is jammed. This type of over current sensor is known in the art but most times there is an automatic reset when the motor cools down. In this case, a manual pushing of reset button 104 is required to allow momentary switch 102 to operate motor.

C. Operation

Handle 50 would be unpinned or unlocked and pin 70 stored in pair of openings 76 in support 42. Handle 50 would be raised to the position of FIG. 11. Block or cubed ice would be manually inserted into ice feed tube 40 by the operator. The operator would pivot the handle and ice ram down to push the ice against chopper head 83, positioned along the path of ice feed tube 40 to ice cabinet 20. The operator would use one hand to push momentary switch 102 and the other to exert downward pressure on handle 50. The ice ram 58 would in turn force the lowest-most ice in tube 40 against chopper head 83 as it rotates blades 84. Ice would be shaved, chipped or crushed and fall by gravity into the ice cavity 20. The operator can make as much chipped, shaved or crushed ice as desired by repeating those steps and fill a substantial amount of the ice cavity if desired.

A cup holder 60 can be removably connected by metal bracket 62 (see FIG. 12) to a complimentary metal bracket 64 mounted on the side of main housing 12 to provide easy availability of multiple cups for scooping and holding snow cone treats. Threaded inserts can be molded into main housing 12 to make it easy to mount bracket 64 to main housing 12. Bracket 62 can just slide in and out of bracket 64 vertically (both are V-shaped, bracket 62 nests within bracket 64). The user has access to the ice cavity through the open side and can scoop ice into a cup, remove it from the apparatus, and then pour the desired syrup on the ice to complete the food item.

Device 10 can be placed on a table top, counter, or even on the floor or another surface. It can be moved into position, when handle 50 is locked to support 42, but lifting, pushing, or pulling device 10 by handle 50.

Customers can view the interior of ice cabinet 20 through window 36. The operator has easy access to an inventory of ice through opening 44. Snow cone cups are easily accessible to the operator.

The operator can lock handle 50 in place to prevent others from gaining access to ice tube 40 or chopper head 83.

The overall shape of device 10 simulates an igloo and is aesthetically pleasing. It also provides a shape having a larger bottom than top for stability purposes.

The one piece molded main housing 12 provides an ice cabinet 20. The plastic provides an enclosure that has an integrated drain pan. There are no edges or joints to be sealed. Drainage is automatic. Alternatively, a plug could be placed over drain tube 96 and the device 10 simply moved over to a sink or place where the plug could be removed and any liquid drained therefrom. Alternatively, a hose could be connected to tube 96 and drained to a bucket or sink or floor drain.

Device 10 is created to have structural strength commensurate with the functions of its parts. For example, handle 50 is made to be robust enough to allow the needed force, in conjunction with ice ram 58, to force ice against chopper head 83 and create shaved or chopped ice. Floor 40 connected to ceiling 15 and side of main housing 12 relies upon its dimensions and the tubular dome shape of main housing 12 for support and structural strength. The edges around window 36 and opening 44 are of increased thickness or structural shapes to assist in structural integrity of main housing 12 during use.

It can therefore be seen that device 10 meets at least all of the stated objectives of the invention. It is conveniently and easily portable. It is practical. It is stable, and it has ease of operation. It shields from direct access chopper head 83 and blades 84, yet allows easy access to them.

D. Options and Alternatives

It can therefore be seen that the invention meets at least all of its stated objectives. The exemplary embodiment is but one form the invention can take. Variations obvious to those skilled in the art are included within the invention.

For example, use of the thicker mounting pads 92 in ice cavity ceiling 90 to mount motor 80 provides additional molded-in or built-in structural support. Some of the existing devices require a separate structural member such as a steel or metal plate. This is eliminated, saving assembly time and cost. Other molded-in structural support or features are shown in the drawings.

The materials and dimensions of device 10 can vary according to desire and need. Some examples for specific device 10 are as follows. Device 10 is approximately 24 inches in height, 35 inches in width across the front, and a depth of 15 inches. The base of main housing 12 is approximately 21 inches whereas distance across the very top 30 is about 4 inches. The thickness of housing 12 walls is ¼ inch nominal. Drain tube 96 is ½ inch (larger than most drains) and has a standard hose fitting in its outer end. It is made of plastic. Wheels 18 are 3 inch diameter plastic and connected by shoulder bolts into a molded stainless steel metal insert in housing 12. The raised ridge or edge 39 around rear opening 38 is a 90° edge. The handle 50 is 16 inches from pivot to its distal end. There is a four finger grip 56 with the knob end 54 formed into a ball for a pull handle.

1. Cup Holder 60

As shown in the drawings, an extended part of molded housing 12 from the left side 28 provides a relatively flat surface for mounting of an optional conventional paper cup holder 60. A bracket on cup holder 60 can insert downwardly into a V-shaped bracket 64 that can be screwed onto the extension from housing 12 into molded metal inserts. The extension to which the cup holder 60 is attached can also serve as a carry handle. The device can be lifted up by grabbing the grip 56 of handle 50 and this extended area on the other side of housing 12. Cup holder 60 can be simply lifted out of its bracket to remove it and, if desired, placed inside ice cavity 20 for storage or transport.

Blade 84 can be an aluminum sand cast piece with stainless steel blades held in place by machine screws. Other types of chopper heads and blades and mounting methods are possible.

The exterior of main housing 12 can have relief lines that evoke the image of ice blocks of an igloo. The plastic can be colored, for example a bright blue.

The relatively large drain opening and relatively severe sloping of the bottom 14 of housing 12 allow for good drainage out of the device.

Changes, alternatives and additional features can be made to device 10. Some examples have been discussed above. Variations obvious to those skilled in the art will be included with the invention, which is solely described by the claims herein. It will be appreciated that not all of the features or aspects of the exemplary embodiment necessarily must be used together.

What is claimed is:

1. An apparatus for creating shaved, chipped or crushed ice, comprising:
   a) a housing including a base, an interior, and an exterior;
   b) a drain in the base;
   c) an ice cavity extending from at or near the base upwardly in the housing;
   d) an ice shaving, chipping or crushing device, including a motor mounted above the ice cavity;
   e) an ice feed tube extending from the exterior of the housing and past the motor;
   f) a handle translateable relative to the ice tube; and
   g) the housing having a general dome or paraboloid shape.

2. The apparatus of claim 1 wherein the top of the housing is removable and covers the motor.

3. The apparatus of claim 1 wherein the handle can be locked to the housing.

4. The apparatus of claim 1 wherein the wheels are mounted on the housing.

5. The apparatus of claim 1 wherein the drain includes a drain tube that is inset from the perimeter of the housing.

6. The apparatus of claim 1 wherein the motor has a momentary switch and a reset switch, the reset switch starting power to the motor upon sensing of a blade blockage condition regardless of operation of the momentary switch.

7. The apparatus of claim 1 further comprising molded end inserts to receive components mounted to the housing.

8. The apparatus of claim 1 further comprising housing that is molded of plastic and has areas of varying thickness for structure rigidity and mounting of components.

9. The apparatus of claim 1 further comprising an embossment and/or engravement on the exterior of the housing.

10. The apparatus of claim 1 further comprising an opening into which is mounted at an at least substantially transparent ocular pane.

* * * * *